United States Patent
Stoll et al.

(10) Patent No.: US 12,423,311 B1
(45) Date of Patent: Sep. 23, 2025

(54) AUTOMATIC GENERATION OF DATA OBJECTS FROM USER INPUT

(71) Applicant: SAP SE, Walldorf (DE)

(72) Inventors: Sascha Stoll, Karlsruhe (DE);
Sebastian Droll, Bruchsal (DE);
Andreas Balzar, Bad Schönborn (DE);
Daniel Buchmann, Karlsruhe (DE);
Bernd Krannich, Sinsheim-Reihen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/893,785

(22) Filed: Sep. 23, 2024

(51) Int. Cl.
*G06F 16/21* (2019.01)
*G06F 16/2457* (2019.01)

(52) U.S. Cl.
CPC ...... *G06F 16/24578* (2019.01); *G06F 16/212* (2019.01)

(58) Field of Classification Search
CPC .......................... G06F 16/24578; G06F 16/212
See application file for complete search history.

(56) References Cited

U.S. PATENT DOCUMENTS

| | | | | |
|---|---|---|---|---|
| 8,280,923 B2* | 10/2012 | Robertson | ............. | G06F 16/252 707/805 |
| 8,744,937 B2* | 6/2014 | Seubert | .................. | G06Q 10/10 705/35 |
| 9,916,318 B2* | 3/2018 | Finlay | ................. | G06F 16/2282 |
| 10,769,127 B2* | 9/2020 | Dandekar | ........... | G06F 16/2272 |
| 11,314,735 B2* | 4/2022 | Cogan | ................... | G06F 16/289 |
| 11,449,529 B2* | 9/2022 | Bracholdt | ............... | G06F 16/26 |
| 2009/0063426 A1* | 3/2009 | Crouch | .................... | G06F 16/35 |
| 2013/0024454 A1* | 1/2013 | Dunn | .................... | G06F 16/907 707/E17.046 |
| 2017/0236073 A1* | 8/2017 | Borisyuk | ............... | G06Q 50/01 706/12 |
| 2021/0318995 A1* | 10/2021 | Portisch | ................ | G06F 16/211 |
| 2023/0289817 A1* | 9/2023 | Ashby | .................. | G06Q 30/015 |
| 2024/0303241 A1* | 9/2024 | Gupta | ............... | G06F 16/24564 |

* cited by examiner

*Primary Examiner* — Jorge A Casanova
(74) *Attorney, Agent, or Firm* — Klarquist Sparkman, LLP

(57) ABSTRACT

The present disclosure relates to techniques for automatically generating new data objects from user input. The system receives user input comprising a plurality of words and executes a first query on a vector store to identify schema elements similar to keywords in the user input. The vector store provides a response with similarity scores for identified elements. A second query is executed on a knowledge graph to identify association paths between data objects that include the identified elements. The knowledge graph response includes association information linking source and target data objects through selected elements. Full association paths are constructed from this information, and a command is generated to instantiate a new data object with elements corresponding to the user input. This approach leverages the strengths of large language models, vector stores, and knowledge graphs to efficiently and accurately create new data objects, ensuring data integrity and relevance.

20 Claims, 30 Drawing Sheets

```
<http://schema.sap.com/ns/vdm#Association> <http://purl.org/dc/elements/1.1/title> "Association" ; a <http://www.w3.org/
    2002/07/owl#Class> ;
        <http://www.w3.org/2000/01/rdf-schema#label> "Association" ;
        <http://www.w3.org/2000/01/rdf-schema#subClassOf> _:uee1a25b1-8e75-4f7d-ab26-a36a44a85f36 .
<http://schema.sap.com/ns/vdm#Association_Element_Pair> <http://purl.org/dc/elements/1.1/title> "Association Element Pair" ;
    a <http://www.w3.org/2002/07/owl#Class> ;
        <http://www.w3.org/2000/01/rdf-schema#label> "Association Element Pair" .

<http://schema.sap.com/ns/vdm#CDS_DataType> <http://purl.org/dc/elements/1.1/title> "CDS DataType" ; a <http://
    www.w3.org/2002/07/owl#Class> ;
        <http://www.w3.org/2000/01/rdf-schema#label> "CDS DataType" ;
        <http://www.w3.org/2000/01/rdf-schema#subClassOf> _:uee1a25b1-8e75-4f7d-ab26-a36a44a85f36 .

<http://schema.sap.com/ns/vdm#CDS_Modeling_Pattern> <http://purl.org/dc/elements/1.1/title> "CDS Modeling Pattern" ;
    a <http://www.w3.org/2002/07/owl#Class> ;
        <http://www.w3.org/2000/01/rdf-schema#label> "CDS Modeling Pattern" ;
        <http://www.w3.org/2000/01/rdf-schema#subClassOf> _:uee1a25b1-8e75-4f7d-ab26-a36a44a85f36 .

<http://schema.sap.com/ns/vdm#CDS_View> <http://purl.org/dc/elements/1.1/title> "CDS View" ; a <http://
    www.w3.org/2002/07/owl#Class> ;
        <http://www.w3.org/2000/01/rdf-schema#label> "CDS View" ;
        <http://www.w3.org/2000/01/rdf-schema#subClassOf> _:uee1a25b1-8e75-4f7d-ab26-a36a44a85f36 .

<http://schema.sap.com/ns/vdm#Element> <http://purl.org/dc/elements/1.1/title> "Element" ; a <http://
    www.w3.org/2002/07/owl#Class> ;
        <http://www.w3.org/2000/01/rdf-schema#label> "Element" ;
        <http://www.w3.org/2000/01/rdf-schema#subClassOf> _:uee1a25b1-8e75-4f7d-ab26-a36a44a85f36 .

<http://schema.sap.com/ns/vdm#p_Description> <http://openanzo.org/ontologies/2008/07/Anzo#range> <http://www.w3.org/2001/
XMLSchema#string> ;
        <http://purl.org/dc/elements/1.1/title> "Description" ;
        a <http://www.w3.org/2002/07/owl#DatatypeProperty> , <http://www.w3.org/2002/07/owl#FunctionalProperty>
;
        <http://www.w3.org/2000/01/rdf-schema#domain> _:u2248f8af-8e89-42be-9727-5bfdb5d9b3b3 ;
        <http://www.w3.org/2000/01/rdf-schema#label> "Description" ;
        <http://www.w3.org/2000/01/rdf-schema#range> <http://www.w3.org/2001/XMLSchema#string> .

<http://schema.sap.com/ns/vdm#p_Has_Modeling_Pattern> <http://openanzo.org/ontologies/2008/07/Anzo#range>
<http://schema.sap.com/ns/vdm#CDS_Modeling_Pattern> ;
        <http://purl.org/dc/elements/1.1/title> "Has Modeling Pattern" ; a <http://
        www.w3.org/2002/07/owl#ObjectProperty> ;
        <http://www.w3.org/2000/01/rdf-schema#domain> <http://schema.sap.com/ns/vdm#CDS_View> ;
        <http://www.w3.org/2000/01/rdf-schema#label> "Has Modeling Pattern" ;
        <http://www.w3.org/2000/01/rdf-schema#range> <http://schema.sap.com/ns/vdm#CDS_Modeling_Pattern> .

<http://schema.sap.com/ns/vdm#p_has_Association> <http://openanzo.org/ontologies/2008/07/Anzo#range>
<http://schema.sap.com/ns/vdm#CDS_View> ;
        <http://purl.org/dc/elements/1.1/title> "has Association" ; a <http://
        www.w3.org/2002/07/owl#ObjectProperty> ;
        <http://www.w3.org/2000/01/rdf-schema#domain> <http://schema.sap.com/ns/vdm#CDS_View> ;
        <http://www.w3.org/2000/01/rdf-schema#label> "has Association" ;
        <http://www.w3.org/2000/01/rdf-schema#range> <http://schema.sap.com/ns/vdm#CDS_View> .

<http://schema.sap.com/ns/vdm#p_has_Association_over> <http://openanzo.org/ontologies/2008/07/Anzo#range>
<http://schema.sap.com/ns/vdm#Association> ;
        <http://purl.org/dc/elements/1.1/title> "has Association over" ;
        a <http://www.w3.org/2002/07/owl#FunctionalProperty> , <http://www.w3.org/2002/07/owl#ObjectProperty> ;
        <http://www.w3.org/2000/01/rdf-schema#domain> <http://schema.sap.com/ns/vdm#CDS_View> ;
        <http://www.w3.org/2000/01/rdf-schema#label> "has Association over" ;
        <http://www.w3.org/2000/01/rdf-schema#range> <http://schema.sap.com/ns/vdm#Association> .

<http://schema.sap.com/ns/vdm#p_has_DataType> <http://openanzo.org/ontologies/2008/07/Anzo#range>
<http://schema.sap.com/ns/vdm#CDS_DataType> ;
        <http://purl.org/dc/elements/1.1/title> "has DataType" ;
        a <http://www.w3.org/2002/07/owl#FunctionalProperty> , <http://www.w3.org/2002/07/owl#ObjectProperty> ;
        <http://www.w3.org/2000/01/rdf-schema#domain> <http://schema.sap.com/ns/vdm#Element> ;
        <http://www.w3.org/2000/01/rdf-schema#label> "has DataType" ;
        <http://www.w3.org/2000/01/rdf-schema#range> <http://schema.sap.com/ns/vdm#CDS_DataType> .
```

```
<http://schema.sap.com/ns/vdm#p_has_Element> <http://openanzo.org/ontologies/2008/07/Anzo#range> <http://schema.
sap.com/ns/vdm#Element> ;
        <http://purl.org/dc/elements/1.1/title> "has Element" ;
        a <http://www.w3.org/2002/07/owl#ObjectProperty> ;
        <http://www.w3.org/2000/01/rdf-schema#domain> <http://schema.sap.com/ns/vdm#CDS_View> ;
        <http://www.w3.org/2000/01/rdf-schema#label> "has Element" ;
        <http://www.w3.org/2000/01/rdf-schema#range> <http://schema.sap.com/ns/vdm#Element> .

<http://schema.sap.com/ns/vdm#p_has_pairing> <http://openanzo.org/ontologies/2008/07/Anzo#range> <http://schema.
sap.com/ns/vdm#Association_Element_Pair> ;
        <http://purl.org/dc/elements/1.1/title> "has pairing" ;
        a <http://www.w3.org/2002/07/owl#FunctionalProperty> , <http://www.w3.org/2002/07/owl#ObjectProperty> ;
        <http://www.w3.org/2000/01/rdf-schema#domain> <http://schema.sap.com/ns/vdm#Association> ;
        <http://www.w3.org/2000/01/rdf-schema#label> "has pairing" ;
        <http://www.w3.org/2000/01/rdf-schema#range> <http://schema.sap.com/ns/vdm#Association_Element_Pair> .

<http://schema.sap.com/ns/vdm#p_has_target> <http://openanzo.org/ontologies/2008/07/Anzo#range> <http://schema.sap.com/
ns/vdm#CDS_View> ;
        <http://purl.org/dc/elements/1.1/title> "has target" ;
        a <http://www.w3.org/2002/07/owl#FunctionalProperty> , <http://www.w3.org/2002/07/owl#ObjectProperty> ;
        <http://www.w3.org/2000/01/rdf-schema#domain> <http://schema.sap.com/ns/vdm#Association> ;
        <http://www.w3.org/2000/01/rdf-schema#label> "has target" ;
        <http://www.w3.org/2000/01/rdf-schema#range> <http://schema.sap.com/ns/vdm#CDS_View> .

<http://schema.sap.com/ns/vdm#p_has_target_element> <http://openanzo.org/ontologies/2008/07/Anzo#range>
<http://schema.sap.com/ns/vdm#Element> ;
        <http://purl.org/dc/elements/1.1/title> "has target element" ;
        a <http://www.w3.org/2002/07/owl#FunctionalProperty> , <http://www.w3.org/2002/07/owl#ObjectProperty> ;
        <http://www.w3.org/2000/01/rdf-schema#domain> <http://schema.sap.com/ns/vdm#Association_Element_Pair> ;
        <http://www.w3.org/2000/01/rdf-schema#label> "has target element" ;
        <http://www.w3.org/2000/01/rdf-schema#range> <http://schema.sap.com/ns/vdm#Element> .

<http://schema.sap.com/ns/vdm#p_isKey> <http://openanzo.org/ontologies/2008/07/Anzo#range> <http://www.w3.org
/2001/XMLSchema#boolean> ;
        <http://purl.org/dc/elements/1.1/title> "isKey" ;
        a <http://www.w3.org/2002/07/owl#DatatypeProperty> , <http://www.w3.org/2002/07/owl#FunctionalProperty>
;
        <http://www.w3.org/2000/01/rdf-schema#domain> <http://schema.sap.com/ns/vdm#Element> ;
        <http://www.w3.org/2000/01/rdf-schema#label> "isKey" ;
        <http://www.w3.org/2000/01/rdf-schema#range> <http://www.w3.org/2001/XMLSchema#boolean> .

<http://schema.sap.com/ns/vdm#p_is_Foreign_Key> <http://openanzo.org/ontologies/2008/07/Anzo#range>
<http://schema.sap.com/ns/vdm#Element> ;
        <http://purl.org/dc/elements/1.1/title> "is Foreign Key" ; a
        <http://www.w3.org/2002/07/owl#ObjectProperty> ;
        <http://www.w3.org/2000/01/rdf-schema#domain> <http://schema.sap.com/ns/vdm#CDS_View> ;
        <http://www.w3.org/2000/01/rdf-schema#label> "is Foreign Key" ;
        <http://www.w3.org/2000/01/rdf-schema#range> <http://schema.sap.com/ns/vdm#Element> .

<http://schema.sap.com/ns/vdm#p_name> <http://openanzo.org/ontologies/2008/07/Anzo#range> <http://www.w3.org
/2001/XMLSchema#string> ;
        <http://purl.org/dc/elements/1.1/title> "Name" ;
        a <http://www.w3.org/2002/07/owl#DatatypeProperty> , <http://www.w3.org/2002/07/owl#FunctionalProperty>
;
        <http://www.w3.org/2000/01/rdf-schema#domain> _:ub1ff9806-50f4-42b9-8613-00a30d77577f ;
        <http://www.w3.org/2000/01/rdf-schema#label> "Name" ;
        <http://www.w3.org/2000/01/rdf-schema#range> <http://www.w3.org/2001/XMLSchema#string> .
```

FIG. 2C

```
{
  "definitions": {                    ┌─404
    "SAP_SD_HL_SalesDocumentItem_V2": {
      "kind": "entity",
      "elements": {
        "SalesDocument": {
          "@DataWarehouse.native.dataType": "NVARCHAR",
          "@EndUserText.label": "Sales Document",
          "type": "cds.String",                              ┌─408
          "length": 10,
          "key": true,
          "notNull": true
        },
        "SoldToParty": {
          "@EndUserText.label": "Sold-to Party",
          "type": "cds.String",
          "length": 10,
          "notNull": true
        },
        "SoldToParty_A": {
          "type": "cds.Association",        ┌─416
          "on": [
            {       ┌─418
              "ref": ["SoldToParty"]
            },
            "=",
            {
              "ref": ["SoldToParty_A", "Customer"]
            }
          ],
          "target": "SAP_LO_Customer_V2",
          "@EndUserText.label": "Sold-to Party to Customer Master Data View"
        }
      },
      "query": {
        "select": [
          "SalesDocument",
          "SoldToParty",
          "SoldToParty_A.Customer"
        ],
        "from": "SalesDocumentsTable"
      },
      "@ObjectModel.supportedCapabilities": [
        {
          "#": "DATA_STRUCTURE"
        }                                    ┌─430
      ],
      "@EndUserText.label": "Sales Document Item (HL)",
      "@ObjectModel.modelingPattern": {
        "#": "ANALYTICAL_FACT"
      },
      "@ObjectModel.association.expands": "SoldToParty_A"
    },
    "SAP_LO_Customer_V2": {
      "kind": "entity",
      "elements": {
        "Customer": {
          "@EndUserText.label": "Customer",
          "type": "cds.String",
          "length": 10,
          "notNull": true
        }
}}}}
```

Entity Definition:

510

<http://sap.com/Definition/90fd0fdf-f272-43a4-9213-024a9c556927>
 <http://sap.com/ontologies/2022/03/CSN#kind>
 "entity" .

<http://sap.com/Definition/90fd0fdf-f272-43a4-9213-024a9c556927>
 <http://sap.com/ontologies/2022/03/CSN#endUserTextLabel>
 "Sales Document Item (HL)" .

<http://sap.com/Definition/90fd0fdf-f272-43a4-9213-024a9c556927>
 <http://www.w3.org/1999/02/22-rdf-syntax-ns#type>
 <http://sap.com/ontologies/2022/03/CSN#Definition> .

<http://sap.com/Definition/90fd0fdf-f272-43a4-9213-024a9c556927>
 <http://sap.com/ontologies/2022/03/CSN#elements>
 <http://sap.com/Element/85fe9dcb-cffd-4ebd-8dbd-be0cd0b509f6> .

FIG. 5A

Element Definition:
```
<http://sap.com/Element/85fe9dcb-cffd-4ebd-8dbd-be0cd0b509f6>
    <http://sap.com/ontologies/2022/03/CSN#endUserTextLabel>
    "Sales Document" .

<http://sap.com/Element/85fe9dcb-cffd-4ebd-8dbd-be0cd0b509f6>
    <http://www.w3.org/1999/02/22-rdf-syntax-ns#type>
    <http://sap.com/ontologies/2022/03/CSN#Element> .

<http://sap.com/Element/85fe9dcb-cffd-4ebd-8dbd-be0cd0b509f6>
    <http://sap.com/ontologies/2022/03/CSN#dataWarehouseNativeDataType>
    "NVARCHAR" .

<http://sap.com/Element/85fe9dcb-cffd-4ebd-8dbd-be0cd0b509f6>
    <http://sap.com/ontologies/2022/03/CSN#type>
    "cds.String" .

<http://sap.com/Element/85fe9dcb-cffd-4ebd-8dbd-be0cd0b509f6>
    <http://sap.com/ontologies/2022/03/CSN#length>
    "10"^^<http://www.w3.org/2001/XMLSchema#integer> .

<http://sap.com/Element/85fe9dcb-cffd-4ebd-8dbd-be0cd0b509f6>
    <http://sap.com/ontologies/2022/03/CSN#key>
    "true"^^<http://www.w3.org/2001/XMLSchema#boolean> .

<http://sap.com/Element/85fe9dcb-cffd-4ebd-8dbd-be0cd0b509f6>
    <http://sap.com/ontologies/2022/03/CSN#notNull>
    "true"^^<http://www.w3.org/2001/XMLSchema#boolean> .

<http://sap.com/Element/85fe9dcb-cffd-4ebd-8dbd-be0cd0b509f6>
    <http://sap.com/ontologies/2022/03/CSN#hasSourceElement>
    <http://sap.com/AssociationElementPair/12345678-1234-1234-1234-123456789012> .

<http://sap.com/Element/85fe9dcb-cffd-4ebd-8dbd-be0cd0b509f6>
    <http://sap.com/ontologies/2022/03/CSN#hasTargetElement>
    <http://sap.com/AssociationElementPair/87654321-4321-4321-4321-210987654321> .

<http://sap.com/Element/85fe9dcb-cffd-4ebd-8dbd-be0cd0b509f6>
    <http://sap.com/ontologies/2022/03/CSN#isForeignKey>
    <http://sap.com/CDSView/23456789-2345-2345-2345-234567890123> .

<http://sap.com/Element/85fe9dcb-cffd-4ebd-8dbd-be0cd0b509f6>
    <http://sap.com/ontologies/2022/03/CSN#hasDataType>
    <http://sap.com/CDSDataType/34567890-3456-3456-3456-345678901234> .
```

520 

FIG. 5B

Association Element Pair Definition:   530
```
<http://sap.com/AssociationElementPair/12345678-1234-1234-1234-123456789012>
    <http://sap.com/ontologies/2022/03/CSN#hasPairing>
    <http://sap.com/Association/45678901-4567-4567-4567-456789012345> .
```

Association Definition:   540
```
<http://sap.com/Association/45678901-4567-4567-4567-456789012345>
    <http://sap.com/ontologies/2022/03/CSN#hasTarget>
    <http://sap.com/CDSView/23456789-2345-2345-2345-234567890123> .

<http://sap.com/Association/45678901-4567-4567-4567-456789012345>
    <http://sap.com/ontologies/2022/03/CSN#hasAssociationOver>
    <http://sap.com/CDSView/23456789-2345-2345-2345-234567890123> .
```

CDS View Definition:   550
```
<http://sap.com/CDSView/23456789-2345-2345-2345-234567890123>
    <http://sap.com/ontologies/2022/03/CSN#hasSource>
    <http://sap.com/CDSView/23456789-2345-2345-2345-234567890123> .

<http://sap.com/CDSView/23456789-2345-2345-2345-234567890123>
    <http://sap.com/ontologies/2022/03/CSN#hasAssociation>
    <http://sap.com/CDSView/23456789-2345-2345-2345-234567890123> .

<http://sap.com/CDSView/23456789-2345-2345-2345-234567890123>
    <http://sap.com/ontologies/2022/03/CSN#hasModelingPattern>
    <http://sap.com/CDSModelingPattern/56789012-5678-5678-5678-567890123456> .
```

CDS Modeling Pattern Definition:   560
```
<http://sap.com/CDSModelingPattern/56789012-5678-5678-5678-567890123456>
    <http://sap.com/ontologies/2022/03/CSN#type>
    <http://sap.com/ontologies/2022/03/CSN#CDSModelingPattern> .
```

CsnValueWrapper Definition:   570
```
<http://sap.com/CsnValueWrapper/65b2c6c8-7a65-4ea1-b6f5-b20bf7dfa8a8>
    <http://www.w3.org/1999/02/22-rdf-syntax-ns#type>
    <http://sap.com/ontologies/2022/03/CSN#CsnValueWrapper> .

<http://sap.com/CsnValueWrapper/65b2c6c8-7a65-4ea1-b6f5-b20bf7dfa8a8>
    <http://sap.com/ontologies/2022/03/CSN#vwVal>
    "DATA_STRUCTURE" .

<http://sap.com/CsnValueWrapper/e19cb1d1-9c2f-4a4d-9bc6-b3c1bd4c9650>
    <http://www.w3.org/1999/02/22-rdf-syntax-ns#type>
    <http://sap.com/ontologies/2022/03/CSN#CsnValueWrapper> .

<http://sap.com/CsnValueWrapper/e19cb1d1
```

FIG. 5C

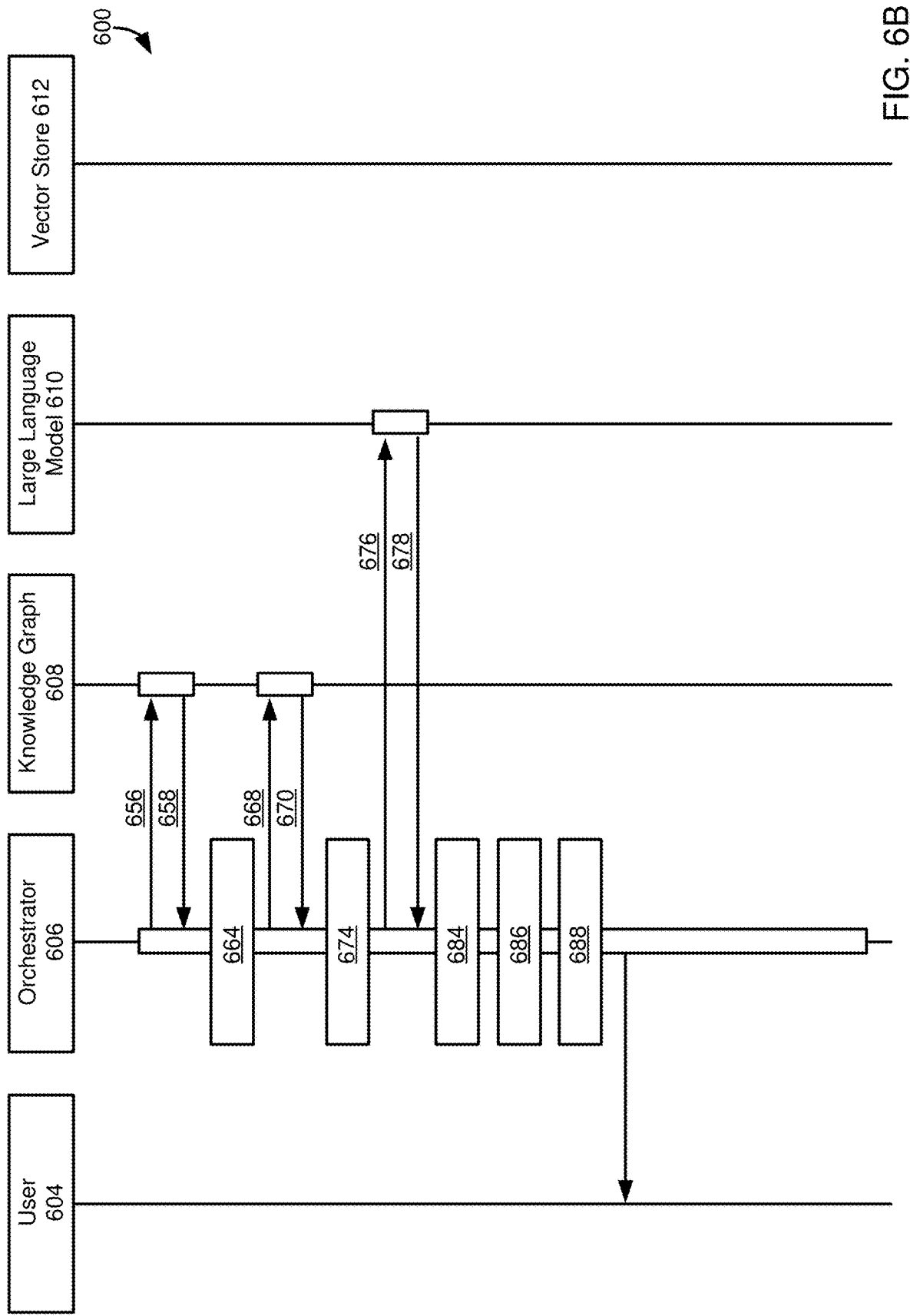

```
PREFIX vdm: <http://schema.sap.com/ns/vdm#>
SELECT DISTINCT ?target_cds_name WHERE {                                710
    ?cds_uri_start vdm:p_name "SAP_SD_HL_SalesDocumentItem_V2" .
    ?cds_uri_target vdm:p_name ?target_cds_name .
    ?cds_uri_start vdm:p_has_Association+ ?cds_uri_target .
  ?cds_uri_target vdm:p_Has_Modeling_Pattern ?pattern_uri .
  ?pattern_uri vdm:p_name ?pattern_name .
  FILTER(?pattern_name != "LANGUAGE_DEPENDENT_TEXT")
```

```
{
  "head": [
    "target_cds_name"
  ],
  "data": [                                    720
    [
      "SAP_MM_PurchasingOrganization_V2"
    ],
    [
      "SAP_LO_StorageLocation_V2"
    ],
    [
      "SAP_BC_Country_V2"
    ],
    [
      "SAP_SD_SalesDocItemCategory_V2"
    ],
    [
      "SAP_LO_Product_V2"
    ],
    [
      "SAP_FI_ChartOfAccounts"
    ],
    [
      "SAP_FI_CompanyCode_V2"
    ],
    [
      "SAP_LO_Supplier_V2"
    ],
    [
      "SAP.TIME.VIEW_DIMENSION_DAY"
    ],
    [
      "SAP_FI_GlobalCompany"
    ],
    [
      "SAP_SD_SalesOrganization_V2"
    ],
    [
      "SAP_LO_Customer_V2"
    ],
    [
      "SAP_MM_Plant_V2"
    ],
    [
      "SAP_SD_SDDocumentReason_V2"
    ]
  ]
}
```

FIG. 7

PROMPT JSON - NO HISTORY
Extract keywords from the following user prompt that can be used to identify fields in a CDS view via embedding similarity that might be helpful to the user prompt. Return your answer in json format {fields: ["field1", "field2"]}. Here is the user prompt: 'Sales Document Item Net Price by the billed to Customer Account Group'

LLM RESPONSE JSON      808
{
   "fields": [
   "Sales Document",
   "Item Net Price",
   "Billed to",
   "Customer Account Group"
   ]
}

FIG. 8

Sales Document        910

```
{
  "text": "SalesDocument;Sales Document", "name":
  "SalesDocument",                                         920
  "description": "Sales Document",
  "cds_name": "SAP_SD_HL_SalesDocumentItem_V2"
} 0.93
{
  "text": "SalesDocumentType;Sales Document Type",
  "name": "SalesDocumentType",
  "description": "Sales Document Type", "cds_name":
  "SAP_SD_HL_SalesDocumentItem_V2"
} 0.89
{
  "text": "SalesDocumentDate;Document Date (Date Received/Sent)",
  "name": "SalesDocumentDate",
  "description": "Document Date (Date Received/Sent)",
  "cds_name": "SAP_SD_HL_SalesDocumentItem_V2"
} 0.89
{
  "text": "SalesDocumentItem;Sales Document Item", "name":
  "SalesDocumentItem",
  "description": "Sales Document Item", "cds_name":
  "SAP_SD_HL_SalesDocumentItem_V2"
} 0.89
{
  "text": "TransactionCurrency;Sales Document Currency", "name":
  "TransactionCurrency",
  "description": "Sales Document Currency",
  "cds_name":
  "SAP_SD_HL_SalesDocumentItem_V2"
} 0.86
```

Sales Document

1012

```
{
    "text": "SalesDocumentItemCategory;Sales Document Item Category", "name":
    "SalesDocumentItemCategory",
    "description": "Sales Document Item Category", "cds_name":
    "SAP_SD_SalesDocItemCategory_V2"
} 0.85
{
    "text": "SDDocumentReason;Order Reason (Reason for the Business Transaction)", "name":
    "SDDocumentReason",
    "description": "Order Reason (Reason for the Business Transaction)", "cds_name":
    "SAP_SD_SDDocumentReason_V2"
} 0.84
{
    "text": "SalesOrganization;Sales Organization", "name": "SalesOrganization",
    "description": "Sales Organization", "cds_name":
    "SAP_SD_SalesOrganization_V2"
} 0.83
{
    "text": "SalesOrganization;Sales Organization", "name": "SalesOrganization",
    "description": "Sales Organization", "cds_name":
    "SAP_LO_StorageLocation_V2"
} 0.83
{
    "text": "TextDeterminationProcedure;Text Determination Procedure for Sales Document Item", "name":
    "TextDeterminationProcedure",
    "description": "Text Determination Procedure for Sales Document Item", "cds_name":
    "SAP_SD_SalesDocItemCategory_V2"
} 0.82
{
    "text": "SalesOrganization;Sales Organization for Intercompany Billing", "name": "SalesOrganization",
    "description": "Sales Organization for Intercompany Billing", "cds_name": "SAP_MM_Plant_V2"
} 0.82
{
    "text": "CompanyCode;Company code of the sales organization", "name": "CompanyCode",
    "description": "Company code of the sales organization", "cds_name":
    "SAP_SD_SalesOrganization_V2"
} 0.82
{
    "text": "ChartOfAccounts;Chart of Accounts", "name":
    "ChartOfAccounts",
    "description": "Chart of Accounts", "cds_name":
    "SAP_FI_ChartOfAccounts"
} 0.81
{
    "text": "ChartOfAccounts;Chart of Accounts", "name":
    "ChartOfAccounts",
    "description": "Chart of Accounts", "cds_name":
    "SAP_FI_CompanyCode_V2"
} 0.81
{
    "text": "SalesOrganizationCurrency;Statistics currency", "name":
    "SalesOrganizationCurrency",
    "description": "Statistics currency", "cds_name":
    "SAP_SD_SalesOrganization_V2"
} 0.81
```

FIG. 10

You are given this user prompt: 'Sales Document Item Net Price by the billed to Customer Account Group' and these fields: [

{
    "index": 0,
    "name": "CustomerAccountGroup",
    "description": "Customer Account Group", "cds_view": "SAP_LO_Customer_V2"
  },
  {
    "index": 1,
    "name": "SalesDocument",
    "description": "Sales Document",
    "cds_view": "SAP_SD_HL_SalesDocumentItem_V2"
  },
  {
    "index": 2,
    "name": "CustomerAccountAssignmentGroup",
    "description": "Customer Account Assignment Group", "cds_view": "SAP_SD_HL_SalesDocumentItem_V2"
  },
  {
    "index": 3,
    "name": "CustomerGroup",
    "description": "Customer Group",
    "cds_view": "SAP_SD_HL_SalesDocumentItem_V2"
  },
  {
    "index": 4,
    "name": "NetPriceAmount",
    "description": "Net Price",
    "cds_view": "SAP_SD_HL_SalesDocumentItem_V2"
  },
  ...

1110

Please select the relevant fields by returning the indexes of the fields you want to use in the JSON format {
  fields: [
    0,
    4,
    17
  ]
}

SPARQL

PREFIX vdm: <http://schema.sap.com/ns/vdm#>

SELECT DISTINCT ?source_name ?source_element_name ?target_name
?target_element_name WHERE {
    ?cds_uri_start vdm:p_name "SAP_SD_HL_SalesDocumentItem_V2" .
    ?cds_uri_start vdm:p_name ?cds_name_start .
    ?cds_uri_target vdm:p_name "SAP_LO_Customer_V2" .
    ?cds_uri_target vdm:p_name ?cds_name_target .

{
    ?cds_uri_start vdm:p_has_Association* ?cds_uri_a .
    ?cds_uri_a vdm:p_has_Association ?cds_uri_b .
    ?cds_uri_b vdm:p_has_Association* ?cds_uri_target .

?cds_uri_a vdm:p_name ?source_name .
    ?cds_uri_b vdm:p_name ?target_name .

?cds_uri_a vdm:p_has_Association_over ?assoc_uri .
    ?assoc_uri vdm:p_has_target ?cds_uri_b .

?assoc_uri vdm:p_name ?assoc_name .
    ?assoc_uri vdm:p_Description ?assoc_desc .

?assoc_uri vdm:p_has_pairing ?assoc_pairing_uri .
    ?assoc_pairing_uri vdm:p_has_source_element ?assoc_element_uri_source .
    ?assoc_pairing_uri vdm:p_has_target_element ?assoc_element_uri_target .
    ?assoc_element_uri_source vdm:p_name ?source_element_name .
    ?assoc_element_uri_target vdm:p_name ?target_element_name .
    }
}

RELEVANCE SCORES 1410

1412

"Sales Document Item Net Price by the billed to Customer Account Group" against [

1414 "from SAP_SD_HL_SalesDocumentItem_V2 to SAP_LO_Customer_V2 matching [\
"SoldToParty\"] to [\"Customer\"]", "from SAP_SD_HL_SalesDocumentItem_V2 to
SAP_LO_Customer_V2 matching [\"BillToParty\"] to [\"Customer\"]", "from
SAP_SD_HL_SalesDocumentItem_V2 to SAP_LO_Customer_V2 matching [\"PayerParty\"] to
[\"Customer\"]", "from SAP_SD_HL_SalesDocumentItem_V2 to SAP_LO_Customer_V2
matching [\"ShipToParty\"] to [\"Customer\"]", "from SAP_SD_HL_SalesDocumentItem_V2 to
SAP_MM_Plant_V2 matching [\"Plant\"] to [\"Plant\"] and from
SAP_MM_Plant_V2 to SAP_LO_Customer_V2 matching [\"PlantCustomer\"] to [\"Customer\"]",
3"from SAP_SD_HL_SalesDocumentItem_V2 to SAP_MM_Plant_V2 matching [\"Plant\"] to [\
"Plant\"] and from SAP_MM_Plant_V2 to SAP_LO_Supplier_V2 matching [\"PlantSupplier\"] to [\
"Supplier\"] and from SAP_LO_Supplier_V2 to SAP_LO_Customer_V2 matching [\"Customer\"] to
[\"Customer\"]"

RELEVANCE SCORES RESPONSE

1450

[
 [
  "from SAP_SD_HL_SalesDocumentItem_V2 to SAP_LO_Customer_V2 matching [\"SoldToParty\"]
  to [\"Customer\"]", 0.780458653421784
 ],
 [
  "from SAP_SD_HL_SalesDocumentItem_V2 to SAP_LO_Customer_V2 matching [\"BillToParty\"] to
  [\"Customer\"]", 0.7887855891039048
 ],
 [
  "from SAP_SD_HL_SalesDocumentItem_V2 to SAP_LO_Customer_V2 matching [\"PayerParty\"] to
  [\"Customer\"]", 0.784039226250757
 ],
 [
  "from SAP_SD_HL_SalesDocumentItem_V2 to SAP_LO_Customer_V2 matching [\"ShipToParty\"]
  to [\"Customer\"]", 0.779908203199733
 ],
 [
  "from SAP_SD_HL_SalesDocumentItem_V2 to SAP_MM_Plant_V2 matching [\"Plant\"] to [\"Plant\"]
  and from SAP_MM_Plant_V2 to SAP_LO_Customer_V2 matching [\"PlantCustomer\"] to [\"Customer\"]",
  0.758110243831364
 ],
 [
  "from SAP_SD_HL_SalesDocumentItem_V2 to SAP_MM_Plant_V2 matching [\"Plant\"] to [\
  "Plant\"] and from SAP_MM_Plant_V2 to SAP_LO_Supplier_V2 matching [\"PlantSupplier\"] to [\
  "Supplier\"] and from SAP_LO_Supplier_V2 to SAP_LO_Customer_V2 matching [\"Customer\"] to
  [\"Customer\"]",
   0.7492000053328411
 ]
]

FIG. 14

PROMPT JSON - NO HISTORY
You are given a number of CDS Views and possible paths to those CDS views. For each of the CDS Views pick the join that fits best to the user prompt: 'Sales Document Item Net Price by the billed to Customer Account Group' from the following list:
CDS View: SAP_LO_Customer_V2 [ ← 1514

{
"path": "from SAP_SD_HL_SalesDocumentItem_V2 to SAP_LO_Customer_V2 matching [\"BillToParty\"] to [\" Customer\"]",
"index": 0
},
{
"path": "from SAP_SD_HL_SalesDocumentItem_V2 to SAP_LO_Customer_V2 matching [\"PayerParty\"] to [\" Customer\"]",
"index": 1
},
{
"path": "from SAP_SD_HL_SalesDocumentItem_V2 to SAP_LO_Customer_V2 matching [\"SoldToParty\"] to [\" Customer\"]",
"index": 2
},
{
"path": "from SAP_SD_HL_SalesDocumentItem_V2 to SAP_LO_Customer_V2 matching [\"ShipToParty\"] to [\" Customer\"]",
"index": 3
},
{
"path": "from SAP_SD_HL_SalesDocumentItem_V2 to SAP_MM_Plant_V2 matching [\"Plant\"] to [\"Plant\"] and from SAP_MM_Plant_V2 to SAP_LO_Customer_V2 matching [\"PlantCustomer\"] to [\"Customer\"]",
"index": 4
},
{
"path": "from SAP_SD_HL_SalesDocumentItem_V2 to SAP_MM_Plant_V2 matching [\"Plant\"] to [\"Plant\"] and from SAP_MM_Plant_V2 to SAP_LO_Supplier_V2 matching [\"PlantSupplier\"] to [\"Supplier\"] and from SAP_LO_Supplier_V2 to SAP_LO_Customer_V2 matching [\"Customer\"] to [\"Customer\"]",
"index": 5
}
]

Return the index of the selected join as JSON for each CDS view in the form {CDS_view_name_1: selected_index_for_cds_view_1, CDS_View_name_2: selected_index_for_cds_view_2, ...}. For example {CDS_view_name_1: 2, CDS_View_name_2: 1}

LLM RESPONSE JSON ← 1550
{
"SAP_LO_Customer_V2": 0
}

```
SELECT                                                              1600
  SAP_SD_HL_SalesDocumentItem_V2.BillToParty,
  SAP_SD_HL_SalesDocumentItem_V2.NetPriceAmount,
  SAP_LO_Customer_V2.CustomerAccountGroup
FROM SAP_SD_HL_SalesDocumentItem_V2
JOIN
  SAP_LO_Customer_V2
ON
SAP_SD_HL_SalesDocumentItem_V2.BillToParty = SAP_LO_Customer_V2.Customer
{
    "definitions":{
      "test": "entity",
      "@EndUserText.label": "test";
      "@ObjectModel.modelingPattern": {
        "#": "DATA_STRUCURE"
      }
      "@ObjectModel.supportedCapabilities": [
        {
          "#": "DATA_STRUCTURE"
        }                                                           1610
      ],
      "@Datawarehouse.consumption.external": false
      "@DataWarehouse.sqlEditor.query": "SELECT
        SAP_SD_HL_SalesDocumentItem_V2.BillToParty,
        SAP_SD_HL_SalesDocumentItem_V2.NetPriceAmount,
        SAP_LO_Customer_v2.CustomerAccountGroup FROM
        SAP_SD_HL_SalesDocumentItem_V2 JOIN SAP_LO_Customer_v2 ON
        SAP_SD_HL_SalesDocumentItem_V2.BillToParty =
        SAP_LO_Customer_V2.Customer"
    }
  }
}
```

FIG. 16

PROMPT JSON - NO HISTORY     1810

Extract keywords from the following user prompt that can be used to identify fields in a CDS view via embedding similarity that might be helpful to the user prompt. Return your answer in json format {fields: ["field1", "field2"]}. Here is the user prompt: 'Sales Document Item Net Price by the billed to Customer Account Group'

LLM RESPONSE JSON     1820

```
{
  "fields": [
    "Sales Document",
    "Item",
    "Net Price", "Billed",
    "Customer Account Group"
  ]
}
```

FIG. 18

SIMILARITY SEARCH 1910

Sales Document

VECTORSTORE RESPONSE

1920

{
  "text": "SalesDocument;Sales Document", "name": "SalesDocument",
  "description": "Sales Document"
} 0.93
{
  "text": "SalesDocument;SalesDocument", "name": "SalesDocument", "description": "SalesDocument"
} 0.92
{
  "text": "SalesDocumentType;Sales Document Type", "name": "SalesDocumentType",
  "description": "Sales Document Type"
} 0.89
{
  "text": "SalesDocumentDate;Document Date (Date Received/Sent)", "name": "SalesDocumentDate",
  "description": "Document Date (Date Received/Sent)"
} 0.89
{
  "text": "SalesDocumentItem;Sales Document Item", "name": "SalesDocumentItem",
  "description": "Sales Document Item"
} 0.89
{
  "text": "SalesDocumentDate;SalesDocumentDate", "name": "SalesDocumentDate",
  "description": "SalesDocumentDate"
} 0.88
{
  "text": "SalesDocumentTypeName;Sales Document Type Description", "name": "SalesDocumentTypeName",
  "description": "Sales Document Type Description"
} 0.88
{
  "text": "SalesDocumentItemType;Item Type", "name": "SalesDocumentItemType",
  "description": "Item Type"
} 0.88
{
  "text": "SalesDocumentItemType;Sales Document Item Type", "name": "SalesDocumentItemType",
  "description": "Sales Document Item Type"
} 0.88
{
  "text": "BillingDocument;Billing Document", "name": "BillingDocument",
  "description": "Billing Document"
} 0.87

FIG. 19

PROMPT JSON - NO HISTORY

You are given this user prompt: 'Sales Document Item Net Price by the billed to Customer Account Group' and these fields: [
  {
    "index": 0,
    "name": "CustomerAccountGroup",
    "description": "Customer Account Group"       2010
  },
  {
    "index": 1,
    "name": "SalesDocument",
    "description": "Sales Document"
  },
  {
    "index": 2,
    "name": "CustomerAccountGroup",
    "description": "CustomerAccountGroup"
  },
  {
    "index": 3,
    "name": "CustomerAccountAssignmentGroup",
    "description": "Customer Account Assignment Group"
  },
  {
    "index": 32,
    "name": "BillingDocument",
    description": "BillingDocument"
  },
  {
    "index": 37,
    "name": "BillToPartyCountry",
    "description": "BillToPartyCountry"
  },
  {
    "index": 38,
    "name": "Division",
    description": "Division for intercompany billing"
  },
  {
    "index": 39,
    "name": "BillingPlan",
    "description": "BillingPlan"
  },
    Please select the relevant fields by returning the indexes of the fields you want to use in the JSON format
{fields: [1, 3, 5]}.

{     2020
      "fields": [ 0,
        1,
        9,
        27
      ]
    }

FIG. 20

```
PREFIX vdm:<http://schema.sap.com/ns/vdm#>
                                                          2110
SELECT DISTINCT ?direct ?reachable WHERE{
          {
          ?cds_view vdm:p_has_Element ?element_uri .
          ?cds_view vdm:p_name ?direct .
          ?element_uri vdm:p_name "CustomerAccountGroup" .
          } UNION
          {
          ?cds_view vdm:p_has_Association+ ?other_cds_view .
          ?cds_view vdm:p_name ?reachable .
          ?other_cds_view vdm:p_has_Element ?other_element_uri .
          ?other_element_uri vdm:p_name "CustomerAccountGroup" . FILTER(?cds_view !=
          ?other_cds_view)
          }
          } ORDER BY DESC(?direct)

{
  "head": [                                               2120
    "direct", "reachable"
  ],
  "data": [ [
          "SAP_SD_IL_T_CustomerAccountGroup", null
     ], [
          "SAP_SD_IL_I_CUSTOMERACCOUNTGROUPTEXT",
          null
     ], [
          "SAP_SD_CustomerAccountGroup", null
     ], [
          "SAP_LO_IL_I_CUSTOMER",
          null
     ],
     [
       null,
       "SAP_LO_Supplier_V2"
     ],
     [
       null,
       "SAP_PP_WorkCenter"
     ],
     [
       null,
       "SAP_MM_Plant_V2"
     ],
     [
       null,
       "SAP_SRV_HL_SrvcOrderItem_V2"
     ],
   ]
}
```

FIG. 21

SORTED OCCURENCE

```
[
  [
    0,
    [
      "SAP_SD_HL_SalesDocumentItem_V2",
      {
        "direct": [ "NetPriceAmount", "BillToParty"
        ],
        "reachable": [ "CustomerAccountGroup"
        ]
      }
    ]
  ]
  ...
  [
    16,
    [
      "SAP_SRV_HL_SrvcOrderItem_V2",
      {
        "direct": [], "reachable": [
          "CustomerAccountGroup"
        ]
      }
    ]
  ]
],
```

2210

FILTERED OCCURENCE [
```
  [
    "SAP_SD_HL_SalesDocumentItem_V2",
    {
      "direct": [ "NetPriceAmount", "BillToParty"
      ],
      "reachable": [ "CustomerAccountGroup"
      ]
    }
  ]
]
```

2220

STARTING VIEW

SAP_SD_HL_SalesDocumentItem_V2

AUTOMATIC GENERATION OF DATA OBJECTS FROM USER INPUT

The present disclosure relates to generating new data objects, such as views in a virtual data model, using existing data objects.

BACKGROUND

Many modern software applications, particularly enterprise-level software applications, rely on structured or semi-structured data. Typically, the structural aspects are present both when corresponding data is being processed and for persisted data.

Structured or semi-structured data is typically associated with a schema (which can also be referred to as a model, such as a data model) or template. A template serves a similar purpose as a schema, but more typically defines how particular data should be interpreted, as opposed to being more prescriptive as to how data must be stored, as with a schema. The present disclosure primarily uses the term "schema" in describing disclosed techniques for case of presentation, but, unless otherwise indicated, the discussion also applies to templates.

Schemas can be very complex, as often enterprise software applications have schemas with hundreds of different data objects (such as table or views, or data stored in similar formats—"entities" with "attributes"), and where individual data objects can have 50, 100, or even larger numbers of attributes. Schemas also typically describe how data objects are related. Data is often stored in multiple data objects for a variety of reasons, including to help maintain data integrity. So, otherwise related data may be in different data objects. Relationships help ensure that the appropriate related data for one data object can be retrieved from a related data object. Examples of relationships include foreign key relationships and associations, where associations can be similar to JOIN conditions (such as specifying two or more related attributes for two data objects and optionally conditions to limit the relationship to appropriate data).

Often, it is desirable to create new data objects. For example, rather than retrieving data from, or referencing, multiple data objects, it may be more computationally efficient (both in terms of data retrieval and update operations and in terms of storage requirements) to define new data objects that incorporate elements from other attributes. Queries or similar operations can then be written with respect to the definition (which can also be referred to as a schema) for the new object. On the "backend", computing processes may retrieve data from the data objects used in the definition of the "new" data object. Optionally, new attributes can be added to the new data object.

Creating new data objects can be difficult for a variety of reasons, including the complexity of schemas and the technical know-how required to find and understand the necessary data objects, as well as to create definitions for these new objects. Data models within databases, and the interfaces to these models, can be very complex. For example, a physical or virtual model for a data source can have a large number of data objects, such as tables and views. These data objects often build on other data objects, and the interrelationships between them can be very intricate. Thus, even for those with semantic knowledge of a schema and the technical skills to implement new data objects, the process can be very time-consuming and prone to error. Moreover, users who lack the requisite knowledge of the schema or technical skills may be unable to create new data objects, even when those new objects could be more resource-efficient than existing ones. Additionally, the challenge extends beyond technical creation to ensuring that new data objects are semantically useful and align with the user's desired outcomes. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure relates to techniques for automatically generating new data objects from user input. The system receives user input comprising a plurality of words and executes a first query on a vector store to identify schema elements similar to keywords in the user input. The vector store provides a response with similarity scores for identified elements. A second query is executed on a knowledge graph to identify association paths between data objects that include the identified elements. The knowledge graph response includes association information linking source and target data objects through selected elements. Full association paths are constructed from this information, and a command is generated to instantiate a new data object with elements corresponding to the user input. This approach leverages the strengths of large language models, vector stores, and knowledge graphs to efficiently and accurately create new data objects, ensuring data integrity and relevance.

In one aspect, the present disclosure provides a process for generating a command to create a data object based on user input. In the process, user input is received that includes a plurality of words. A first query is caused to be executed on a vector store to identify elements of a schema. The schema includes definitions of a plurality of data objects that each include a plurality of elements that are similar to keywords in the user input. The vector store provides a first query response that includes similarity scores for identified elements of the schema.

A second query is caused to be executed on a knowledge graph to identify association paths between at least a portion of data objects of the schema having definitions that include at least one element of the one or more of the identified elements. The second query response includes association information for given pairs of two or more pairs of data objects of the at least a portion of the data objects of the schema. This association information includes a source data object, a target data object, and at least one of the one or more selected elements that serve to operationally link the source data object and the target data object.

From the association information, full association paths between data objects of the at least a portion of the data objects are constructed. From the full association paths, a command is generated to instantiate a data object having elements corresponding to keywords of the user prompt.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 2B and 2C illustrate an example computer representation of the ontology of FIG. 2A.

FIG. 4 is an example data object definition, which can be processed and information about the data object definition stored in a knowledge graph.

FIGS. 5A-5C illustrate example RDF triples that can be obtained from processing a data object definition.

FIGS. 6A and 6B provide a timing diagram of operations with various components of the computing environment of FIG. 1 in creating a data object definition for a new data object based on existing data objects and user input.

FIG. 7 provides an example request to a knowledge graph to obtain information regarding data objects that are related to an identified data object, as well as an example response to the request.

FIG. 8 provides an example prompt that can be provided to a large language model to extract keywords from user input, as well as an example response from the large language model.

FIG. 9 provides example search criteria for searching a vector store for elements of a data object schema that are relevant, such as based on a similarity score, to a keyword of user input, as well as example search results, for a specified starting data object.

FIG. 10 provides example search criteria for searching a vector store for elements of a data object schema that are relevant, such as based on a similarity score, to a keyword of a user input, as well as example search results, for data objects that are associated with a starting data object.

FIG. 11 provides an example prompt that can be provided to a large language model to identify elements of a data object schema that are relevant to user input, as well as an example response by the large language model.

FIG. 12 provides an example SPARQL query for obtaining association path fragments, such as for pairs of related data objects, from a knowledge graph.

FIG. 14 provides an example query to a vector store to determine similarity metrics for association paths with respect to user input, as well as an example query response.

FIG. 15 provides an example prompt to a large language model to select best association paths from multiple candidate association paths, and an example response.

FIG. 16 provides a definition of an example data object created using disclosed techniques.

FIG. 18 provides an example prompt to a large language model to identify keywords in user input, as well as an example response from the large language model.

FIG. 19 provides example input provided to a vector store to identify elements of a data object schema that are similar to keywords in a user prompt that were identified by a large language model.

FIG. 20 provides an example prompt to a large language model to select elements identified from a vector store search as in FIG. 19 that are relevant to user input, as well as an example response from the large language model.

FIG. 21 provides an example request, and response, to a knowledge graph to identify data objects in a data object schema that contain, or can be used to access, elements identified as relevant by a large language model in the response provided in FIG. 20.

FIG. 22 illustrates how candidate starting data objects can be sorted and filtered to obtain a starting view or a list of candidate starting data objects that can be submitted to a user or a large language model to select a starting data object.

DETAILED DESCRIPTION

Example 1)—Overview

Figure 1:
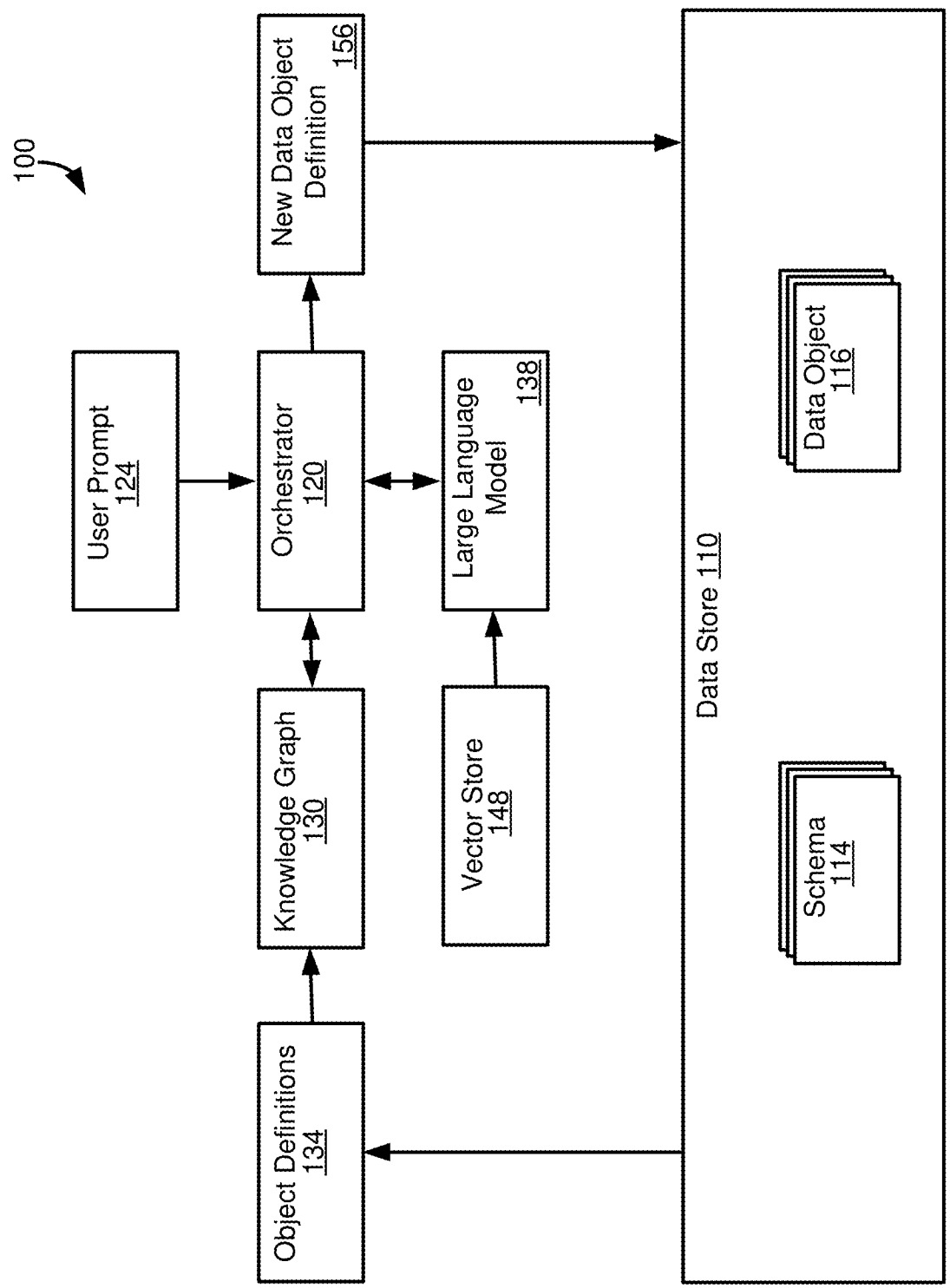
FIG. 1 is a diagram depicting an example computing environment in which disclosed techniques can be implemented, which includes components that can be used to generate a definition of a new data object based on existing data objects in response to user input.

Many modern software applications, particularly enterprise-level software applications, rely on structured or semi-structured data. Typically, the structural aspects are present both when corresponding data is being processed and for persisted data.

Structured or semi-structured data is typically associated with a schema (which can also be referred to as a model, such as a data model) or template. A template serves a similar purpose as a schema, but more typically defines how particular data should be interpreted, as opposed to being more prescriptive as to how data must be stored, as with a schema. The present disclosure primarily uses the term "schema" in describing disclosed techniques for ease of presentation, but, unless otherwise indicated, the discussion also applies to templates.

Schemas can be very complex, as often enterprise software applications have schemas with hundreds of different data objects (such as table or views, or data stored in similar formats—"entities" with "attributes"), and where individual data objects can have 50, 100, or even larger numbers of attributes. Schemas also typically describe how data objects are related. Data is often stored in multiple data objects for a variety of reasons, including to help maintain data integrity. So, otherwise related data may be in different data objects. Relationships help ensure that the appropriate related data for one data object can be retrieved from a related data object. Examples of relationships include foreign key relationships and associations, where associations can be similar to JOIN conditions (such as specifying two or more related attributes for two data objects and optionally conditions to limit the relationship to appropriate data). Examples of association include associations as used in CDS or ABAP views in technologies of SAP SE, of Walldorf, Germany.

Often, it is desirable to create new data objects. For example, rather than retrieving data from, or referencing, multiple data objects, it may be more computationally efficient (both in terms of data retrieval and update operations and in terms of storage requirements) to define new data objects that incorporate elements from other data objects. Queries or similar operations can then be written with respect to the definition (which can also be referred to as a schema) for the new object. On the "backend", computing processes may retrieve data from the data objects used in the definition of the "new" data object when the new data object is accessed. Optionally, new attributes can be added to the new data object.

Creating new data objects can be difficult for a variety of reasons, including the complexity of schemas and the technical know-how required to find and understand the necessary data objects, as well as to create definitions for these new objects. Data models within databases, and the interfaces to these models, can be very complex. For example, a physical or virtual model for a data source can have a large number of data objects, such as tables and views. These data objects often build on other data objects, and the interrelationships between them can be very intricate. Thus, even for those with semantic knowledge of a schema and the technical skills to implement new data objects, the process can be very time-consuming and prone to error. Moreover, users who lack the requisite knowledge of the schema or technical skills may be unable to create new data objects, even when those new objects could be more resource-efficient than existing ones. Additionally, the challenge extends beyond technical creation to ensuring that new data objects are semantically useful and align with the user's desired outcomes. Accordingly, room for improvement exists.

The present disclosure helps address these issues by allowing users to create new data objects simply by expressing what attributes (or more specifically, concepts that either are attributes or can be matched with an attribute using disclosed techniques) they are interested in including in a new data object. User intent, such as expressed in a prompt to a large language model or to a software application, can be analyzed, such as using techniques like named entity recognition techniques and entity linking or using vector-based comparisons, and compared with information from existing schema data objects.

In particular, a schema can be processed to extract information of interest, where the information can then be converted into a knowledge graph. For example, an ontology can be defined and applied to the extracted information to create RDF (Resource Description Framework) triples that can be used in a knowledge graph. Information in the knowledge graph, such as elements names and element descriptions, can be submitted to an embedding generator (such as doc2vec, text-embedding-ada-002 of OPENAI, COHERE EMBEDDING API, HUGGING FACE MODELS, or the BTI AICORE SERVICE from SAP SE, or similar techniques) to generate embeddings for elements that are stored in a vector store. In some cases, information from the knowledge graph can be concatenated and that result used to generate an embedding, which can help avoid a vector store search returning duplicative results.

Comparing the user intent with the information about the schema provides data objects, or data object elements (such as attributes), that may be related to the user intent, and thus useable in creating the new data object. The identified data object elements can be compared with the user intent, and the most relevant elements selected for use in defining the new data object. A list of retrieved elements can be deduplicated prior to further processing.

For the selected elements, relationships between the identified data objects can be evaluated, such as possible association or join paths. Considering paths can include considering both an order in which multiple data objects are used in an overall relationship (that is, an association or join path can include multiple, typically pair-wise, relationships through multiple data objects) and of which particular elements are used to relate a given pair of data objects. For example, two data objects may have multiple relationships, relevant to different use cases. In a schema used for sales information, a data object for a sales document can be related to a customer data object through "bill to," "ship to," "sold to," or "payer" relationships. Processing the user intent can help determine, for example, that the user is interested in the "ship to" relationship rather than one of the other relationships, which can help ensure the correct data is retrieved and the new data object will satisfy the user's needs.

Once the relevant data objects, elements, and relationships are identified, this information can be used to a variety of purposes, including in commands that can be executed to create the new data object in the schema. For example, the information can be serialized to SQL statements, which can then be executed to create a SQL view, such as how that term is used in products of SAP SE, of Walldorf, Germany.

As discussed, a set of data objects used in defining a new data object can be very large, and relationships between data objects can be considered in particular orders. To help simplify processing by having fewer alternatives or permutations to consider, and to avoid situations when not all needed elements can be reached from a particular data object, it can be useful to identify a "starting data object."

User intent can be processed as described before, again looking for data object elements that are relevant to the user's intent. For elements that are selected by a large language model as most relevant, data objects having the data elements are identified, and then can be sorted by number of directly or indirectly reachable elements. If only a single data object is identified, it can be selected as a starting data object. If multiple data objects are identified, they can be displayed to a user, including with information regarding "similarity" or number and types of relationships, and a user can select a starting data object. Alternatively, rules can be applied to select a starting data object, such as selecting the data object with the highest similarity score or number or type of relationships. In another implementation, information about the possible starting data objects can be provided to a large language model, which can then select the starting data object.

Disclosed techniques can thus provide a variety of technical benefits, including facilitating the creation of new data objects that may be more useful to end users, as well as potentially being more performant. The described operations are fundamentally computer-implemented, and cannot be performed mentally by a human. For example, the size of the schemas, and associated knowledge graph, are too large to be processed by a human. Moreover, a human trying to perform the disclosed subject matter would face the same difficulties as in prior techniques for creating new data object. A user would need to understand how to access and interpret knowledge graphs, and how to interact with a large language model and other components, such as a vector store.

Disclosed techniques are capable of identifying data objects and relationship information needed to define, and create, a new data object in real time. For example, disclosed techniques can identify the information necessary to create a new data object, and to create the data object, in 20 minutes or less, 10 minutes or less, 5 minutes or less, 1 minute or less, 30 seconds or less, 10 seconds or less, or 5 seconds or less. Thus, the disclosed techniques are too complex to be practically performed by a human, particularly in real time—a time in which a user of a software application expects to obtain an outcome in response to their expressed intent.

Disclosed techniques leverage the unique strengths of various advanced technologies to enhance the creation of new data objects. Specifically, the large language model (LLM) is used for creative tasks such as understanding user intent and selecting elements for similarity searches, where such searches might otherwise yield results that are not sufficiently specific. The LLM also helps in determining optimized association paths. The vector store identifies elements of a schema that are more relevant to user intent, but the scope of the search is effectively limited by first leveraging the knowledge graph to focus the search results on relevant data objects. This strategic combination ensures that each technology is used according to its strengths, resulting in a robust and efficient system.

The knowledge graph provides a structured representation of the schema, capturing complex relationships and associations between data objects. This facilitates the identification of relevant data paths and ensures the integrity of data relationships. By grounding the LLM's selections against the structured metadata in the knowledge graph and vector store, the system increases reliability and reduces the likelihood of hallucinations. This approach helps overcome challenges such as the large number of elements and views, and the unspecific results from similarity searches with complete prompts.

Example 2)—Computing Environment with Components Useable to Generate a New Data Object in Response to a User Prompt FIG. 1 illustrates a computing environment 100 in which disclosed techniques can be implemented. The computing environment 100 includes a data store 110. The data store 110 can store, or provide access to, data according to one or more schemas 114, each having one or more related data objects 116. While in some implementations the data store 110 physically stores data, in other cases a schema 114 references data objects in another location. For example, the data store 110 can be a relational database, and the schema 114 can be a physical data model. In another example, the data store 110 can be a virtual data model, such as ABAP or CDS views in technologies of SAP SE, of Walldorf, Germany. Data objects 116 can be defined with respect to a schema associated with a system that physically stores data, such as where ABAP or CDS views are defined with respect to relational database tables. In a specific implementation, the data store 110 is DATASPHERE of SAP SE.

An orchestrator 120 receives user prompts 124, or other expressions of a user intent, such as particular attributes (or more generally, elements) they would like to include in a data object to be generated. While the term prompt is used, the disclosed techniques more generally operate on user input, regardless of the context in which it is provided. While a user prompt 124 includes attributes that the user would like to include in a data object, the user prompt does not need to specifically identify any specific attributes of a schema. When the user prompt 124 is processed, semantics associated with the user prompt can be determined and used to identify semantically corresponding attributes of a schema.

In particular, the orchestrator 120 can perform operations to identify elements of a user intent, and then search a knowledge graph 130 to identify corresponding elements, such as data objects, data object elements, or data object relationships. As described, the knowledge graph 130 can be constructed using object definitions 134, where the object definitions can be obtained from a schema 114 of the data store 110, including as reflected in a data dictionary, information schema, or system catalog. In a specific example, the knowledge graph 130 is implemented using ANZOGRAPH of Cambridge Semantics.

At various times when processing a user prompt 124 and performing operations to generate a new data object, the orchestrator 120 can interact with a large language model 138. These interactions will be described in greater detail, but can include identifying relevant keywords or phrases in a user intent, evaluating data object elements for relevancy to a user intent, or for evaluating the relevance of data objects to a user intent, such as when selecting starting data objects. While any suitable large language model 138 can be used, examples of suitable large language models include those available from OpenAI, including GPT-4 or GPT-4o.

The computing environment 100 also includes a vector store 148. The vector store 148 can store embeddings of all or a portion of the content of the knowledge graph 130. In some cases, aspects of the knowledge graph 130 relevant to a user intent, or otherwise used in processing a user intent, can be first identified using the vector store 148. For example, relevant elements can be identified using the vector store 148, and then associated data objects, and other data objects associated with such data objects, can be determined from the knowledge graph 130. An example vector store 148 is HANA CLOUD VECTOR ENGINE of SAP SE.

The orchestrator 120 can take results of processing the user prompts 124 and cause a new data object definition 156 to be created. The new data object definition 156 can be stored in the data store 110, and instantiated as a data object 116.

Figure 2A:
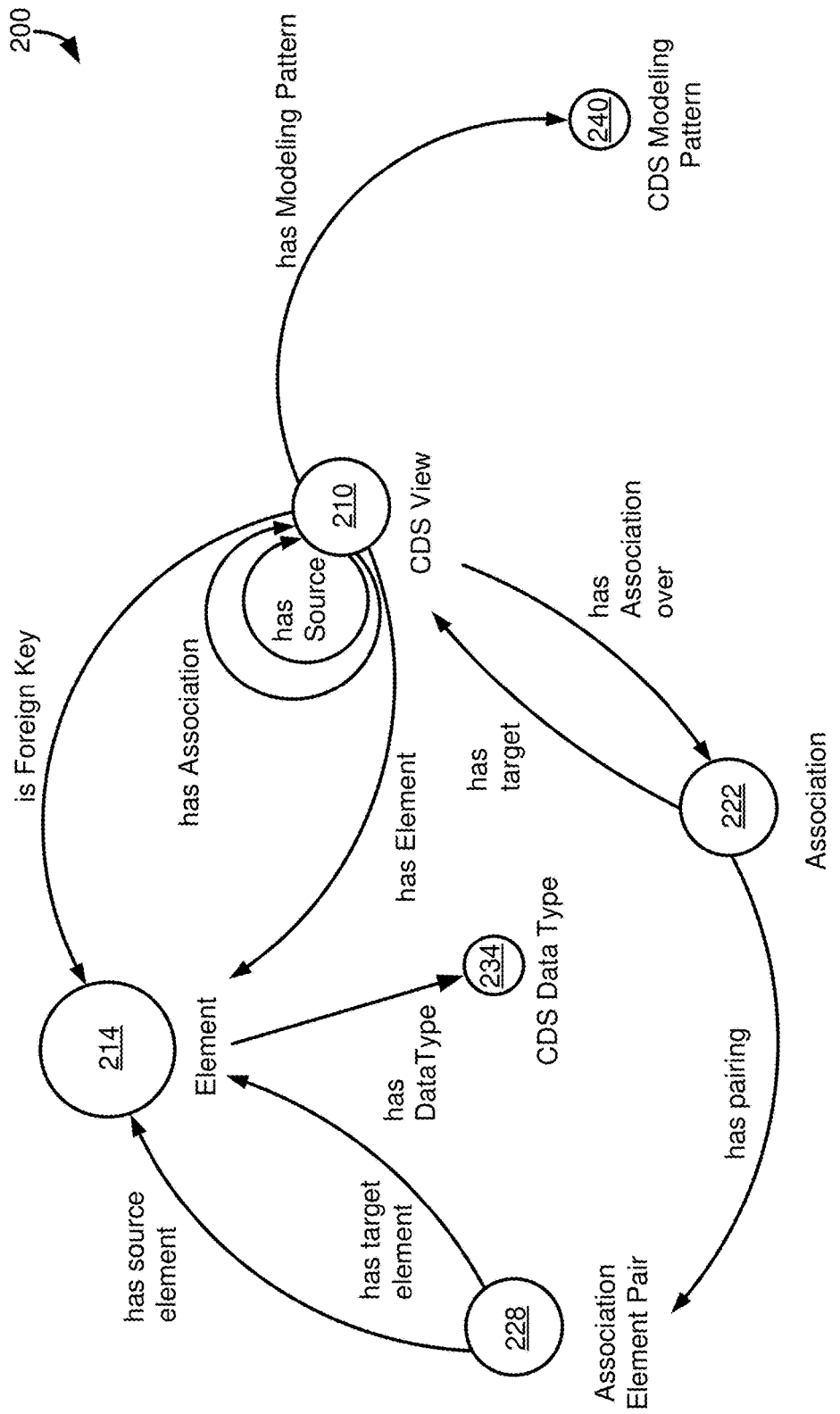
FIG. 2A illustrates an example ontology that can be used with a knowledge graph of information in a data object schema.

Example 3)—Example Ontology Useable with Knowledge Graphs for Data Object Schemas FIG. 2A provides an ontology 200 that can be used with knowledge graphs of the present disclosure. The ontology 200 can differ from that shown, including by having more ontological concepts or relationships. Further, although the disclosed techniques are generally described as using an ontology, knowledge graphs can be used without a formal ontology. For example, software logic can be used to impose structural and semantic requirements in a similar manner as an ontology. Software logic can be used to ensure that instances of particular knowledge graph classes have properties that are appropriate for that class, and have appropriate relationships with instances of other classes.

The ontology 200 is defined specifically for use with CDS views. A CDS view class 210 represents such views. Relationships (also referred to as properties in the field of ontologies) can be defined for individuals of the CDS view class 210, such as shown in FIG. 2 where one individual can have a "has Association" or "has Source" relationship with another individual of the CDS view class 210.

The CDS view class 210 can have several types of relationships with an element class 214, where at least some elements can correspond to attributes of a data object, such as columns (as referred to as fields) of a database table or view, or their virtual data model equivalents. Elements that are defined for a CDS view can have a "has Element" relationship, while those elements that serve as foreign keys to elements of other CDS views can have an "is Foreign Key" relationship. As discussed, disclosed techniques can be used with a variety of data objects, and so the foreign key relationship can be replaced with some other property representing a relationship between data objects.

Individuals of the CDS view class 210 can be related via an association class 222. In particular, the association class 222 can be related to the CDS view class 210 using a "has target" relationship or a "has Association over" relationship. That is, associations are typically directed relationships between two individuals of the CDS class.

Relationships between individuals of the CDS view class 210, in an association, are typically through one or more specific elements of each individual. Accordingly, the association class 222 is related to an association element pair class 228 via a "has pairing" relationship. In turn, the association element pair class 228 relates to the element class 214 using a "has source element" relationship or a "has target element" relationship, again depending on the directionality of the relationship.

Additional information can be associated with the element class 214, such as through a "has Data Type" relationship with a CDS data type class 234. The CDS view class 210 can be associated with a CDS modelling pattern class 240, through a "has Modelling Pattern" relationship. A modelling pattern can be a template on which a particular CDS view is based, such as reflecting a purpose of a view. As examples, different templates can be provided for a basic view, a composite view, a transaction view, an analytical view, a hierarchy view, or an interface view. These modelling patterns can also reflect a hierarchical level of a CDS view, where higher-level views build on lower-level views, where lower-level views are often simpler and closer to data sources, and where higher-level views are often those directly accessed by software applications.

FIGS. 2B and 2C provide a computer implementation 270 of the ontology 200.

Figure 3:
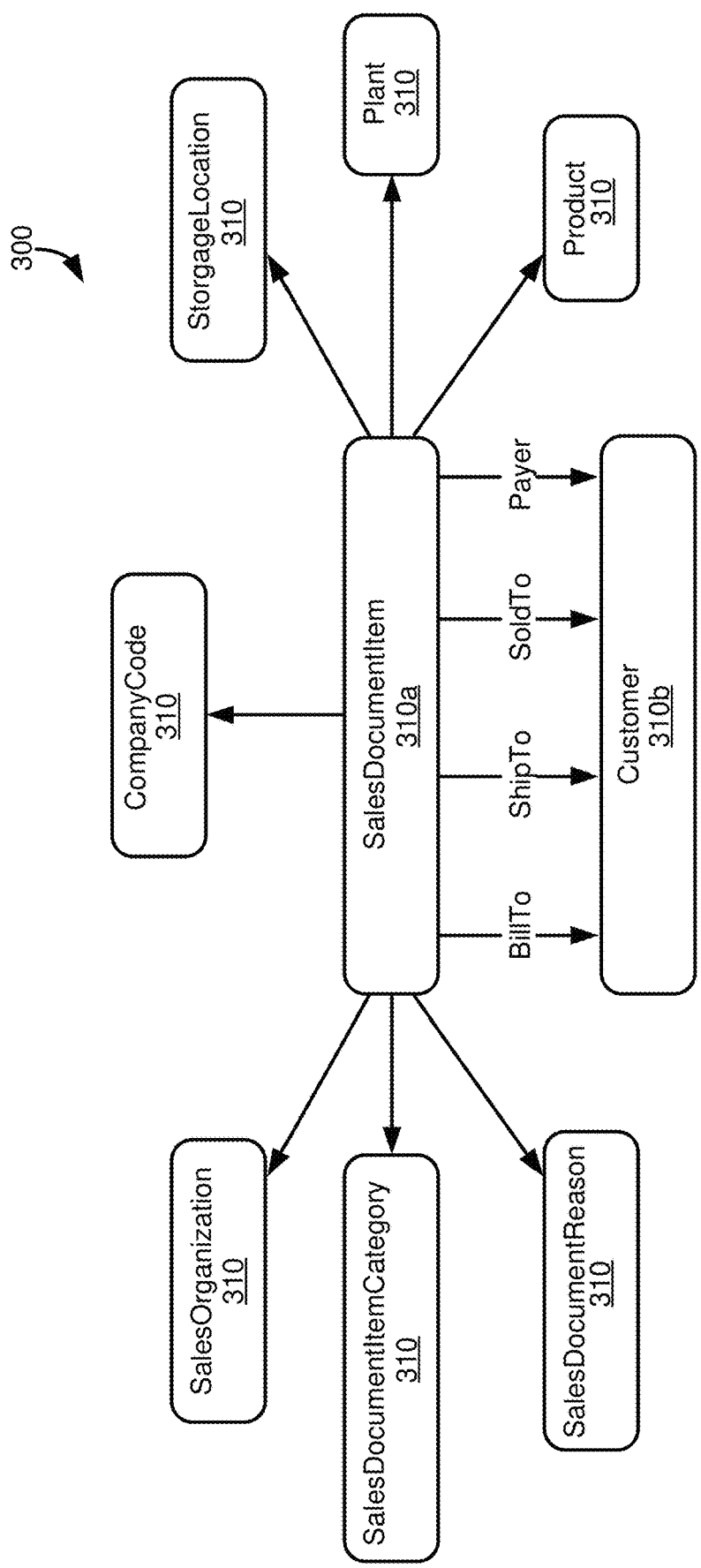
FIG. 3 is a diagram of a portion of a data object schema, illustrating how data objects can be related, including where two data objects have multiple relationships, with each relationship being associated with different elements of the data objects.

FIG. 3 illustrates a schema 300, which can be a portion of a larger schema. The schema 300 illustrates how data objects 310 can be related, including with directed relationships. FIG. 3 also illustrates how two data objects can be related in multiple ways, which can be associated with different use cases (and thus semantic differences). In particular, note that a SalesDocumentItem data object 310*a* is related to a Customer data object 310*b* in four different ways, depending on whether the relationship is where information in a sales document item reflects a billing to a customer, a shipping of an item to a customer, the selling of an item to a customer, or indicating that a customer is a payer for a sales order.

Example 4—Example Data Object

Disclosed techniques use a knowledge graph and a vector store representation of information in a knowledge graph. To create the knowledge graph, information about a schema and its data objects can be extracted, such as from a data dictionary, information schema, or system catalog. The information about a schema is typically associated with tags or syntax elements that allow them to be mapped to an ontology, where RDF triples can be created, and then used to form a knowledge graph.

FIG. 4 provides a partial example object definition 400, such as in the format of a CDS view. It can be seen that the definition 400 includes various components that can be used in disclosed techniques, such as a name 404, a type 406, information 408 about elements of the data object (which can correspond to attributes, also known as fields or column of a view), where the information can include information such as a data type of a given element, whether the element is used as part of a primary key for the data object, or whether null values are permitted.

The object definition 400 also includes information about relationships with other data objects, such as through association information 416. In particular, the association information 416 indicates that the SoldToParty element 418 is related to a Customer field in a "SAP_LO_Customer_V2" view. The object definition 400 has a component 430 indicating that the object uses the "ANALYTIC_FACT" modelling pattern.

Processing the object definition 400 with programmatic logic that links components of the object definition with the ontology 200 can produce RDF triples, which are shown in FIGS. 5A-5C. FIG. 5A illustrates RDF triples 510 that provide fundamental definition features of the data object, such that it is an entity that has a label of "Sales Document Item (HL)". FIG. 5B provides RDF triples 520 for elements of the object definition 400, including information as to whether elements are part of an association pair or serve as a foreign key. FIG. 5C provides RDF triples 530 for the association pair class, triples 540 for an association definition, triples 550 for information about relationships with other views, such as whether the view has a source view or an association to another view, and a modelling pattern used by the view. FIG. 5C also provides an RDF triple 560 indicating a modeling pattern used by the object, and triples 570 for a "CsnValueWrapper" definition, which can encapsulate data type information or other metadata for elements of a data object definition.

Figure 6A:
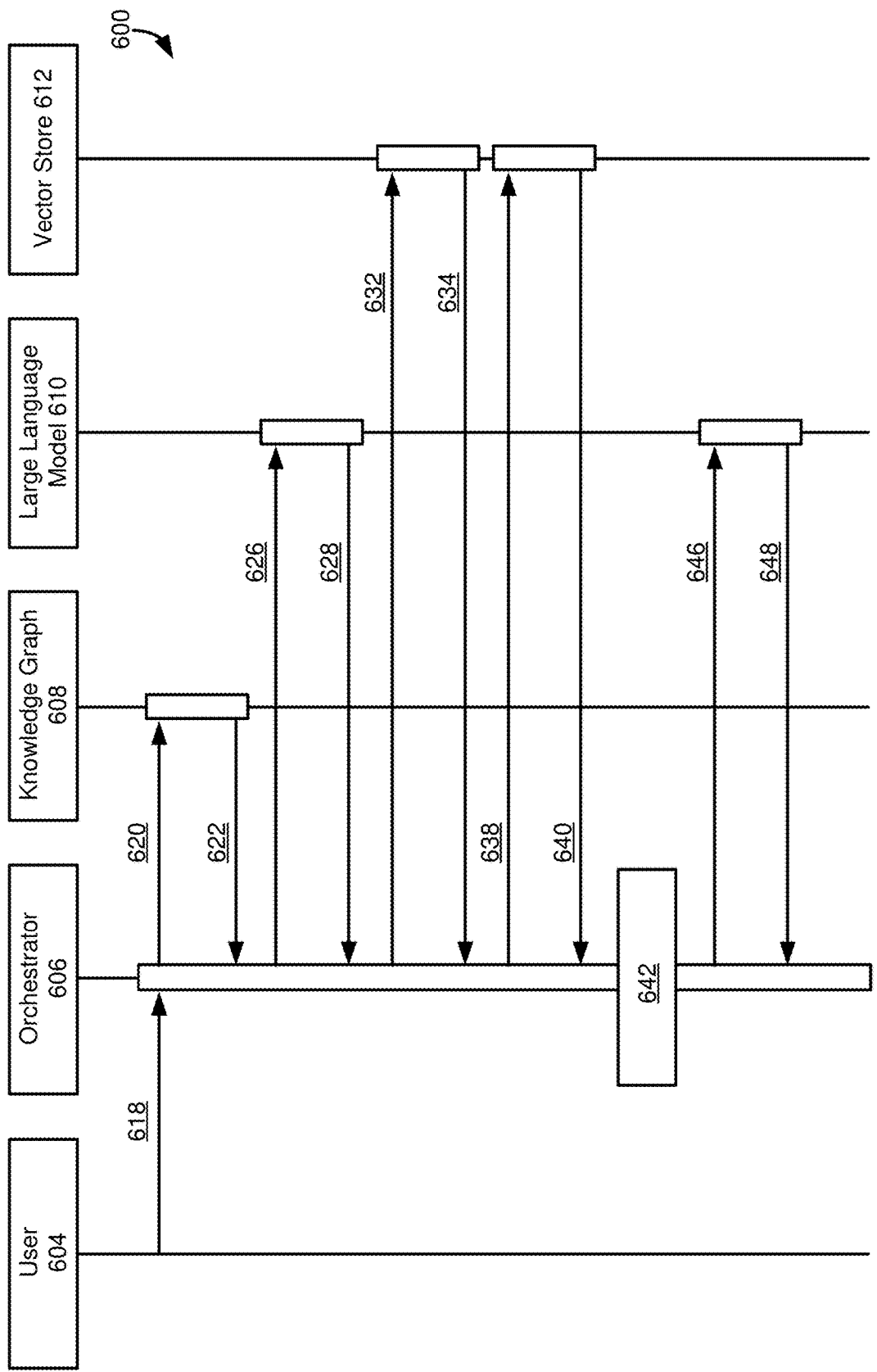

Example 5—Example Process of Generating a Data Object Definition Based on User Input FIGS. 6A and 6B provide a timing diagram illustrating operations 600 performed by components of the computing environment 100 of FIG. 1. In particular, the operations 600 are performed by a user 604 (who submits a user prompt 124), an orchestrator 606 (the orchestrator 120), a knowledge graph 608 (the knowledge graph 130), a large language model 610 (the large language model 138), and a vector store 612 (the vector store 148).

At 618, the user 604 provides a prompt to the orchestrator 606. A first operation to be performed is to obtain views that are associated with a fixed starting view, where selection of the starting view will be described in Example 6. Optionally, related views can be limited to those within a fixed depth, which can be a level of indirection between two related views (such as a number of intermediate views). Alternatively, the system can traverse an arbitrary depth, meaning it can explore all levels of indirection within the schema without any predefined limit, ensuring comprehensive retrieval of related views.

The orchestrator 606 submits a query to the knowledge graph 608 at 620, and receives a response at 622. FIG. 7 provides an example knowledge graph query 710, in this case a SPARQL query, and portion 720 of the response from the knowledge graph. Note that the knowledge graph query 710 includes the starting view, SalesDocumentItem_V2, and excludes from results those views having a modeling pattern of LANGUAGE_DEPENDENT_TEXT. This exclusion can be for specific use cases where language dependent keys are not particularly relevant. In other use cases, this exclusion is omitted, or other modelling patterns can be excluded. The portion 720 of the response contains a list of matching, related views.

Returning to FIG. 6A, at 626, the orchestrator 606 submits a request to the large language model 610 to identify keywords in the user prompt, where the keywords will be used in a similarity search to retrieve the names of relevant elements in the views identified as related to the starting view.

FIG. 8 provides an example prompt 800 that can be submitted to the large language model 610 at 626, where a response received at 628. Note that a specific JSON output is specified in the prompt 800, as well as the original user prompt received at 618. An example response 808 is also illustrated in FIG. 8, where the response is in the JSON format specified in the prompt 800. The example response 808 corresponds to semantic keywords, rather than explicitly specifying elements of an existing schema.

The fields identified by the large language model 610 are submitted to the vector store 612 by the orchestrator 606 at 632, and a response is received at 634. The vector store 612 identifies elements of the starting view that are most similar to the keywords extracted from the user prompt. Similarity scores can be calculated using techniques such as cosine similarity, Euclidean distance, or dot product. FIG. 9 illustrates example keyword input 910 provided to a vector store, and the corresponding response 920. The response 920 provides, for each identified element in the starting view, the text, name, description, and CDS name of the element, as well as the calculated similarity score. Optionally, the response 920 can be ordered by similarity score, such as in a descending order.

At 638, the orchestrator 606 submits a request to the vector store 612 to perform a similarity search using the keywords identified by the large language model 610. A "naïve" vector initial vector query searches across elements in all views. However, to optimize the search process and improve the efficiency of the results, the vector store query can be refined by applying a filter based on the views identified by the knowledge graph 608 as being reachable from the starting view, as identified by the knowledge graph search performed at 620, 622.

For instance, consider the following example query, where the similarity search is limited to elements within specific views identified by the knowledge graph, such as SAP_SD_HL_SalesDocumentItem_V2, SAP_SD_SalesOrganization_V2, and SAP_FI_CompanyCode_V2.
   SELECT TOP 5 TEXT, VIEW_NAME, ELEM_NAME,
   COSINE_SIMILARITY(VECTOR, TO_REAL_VECTOR('[0.00049764593, ... ,−0.0033372566]')) AS SCORE
   FROM DPS_EMBEDDINGS
   WHERE VIEW_NAME IN ('SAP_SD_HL_SalesDocumentItem_V2', 'SAP_SD_SalesOrganization_V2','SAP_FI_CompanyCode_V2')
   ORDER BY SCORE DESC;

In this query, the similarity search is constrained to a specific list of views that are reachable from the starting view, narrowing down the search space to those views that are directly or indirectly associated with it. The query retrieves the top 5 results, ordered by their similarity score, which is calculated using cosine similarity between the vector representations. This refinement ensures that the search is conducted within a more targeted subset of data, improving both the efficiency and focus of the results. The response from this optimized query, like the example response 920, can be used to further process or display the elements within these reachable views.

Rather than a single query for all data objects for each keyword, the starting data object and the associated data objects can be searched individually for each keyword.

Returning to FIG. 6A, at 642, the elements in the responses 634, 640 are sorted by similarity score, such as in descending order. Sorting the elements by similarity score ensures that the context provided to the large language model 610 is consistent and relevant, thereby reducing any potential influence of random order. In other words, the sorting helps provide more deterministic responses from the large language model 610 by maintaining a consistent and meaningful context.

Additional operations can be performed at 642, such as removing certain information (such as a key value pair), renaming information (such as renaming a key), or adding information. For example, it may be beneficial to replace the similarity score with an index representing a position of information for an element of the response 920 in the sorted representation, which can help avoid ambiguity in the scenario where multiple elements of the response have the same similarity score.

At least a portion of the elements in the sorted list produced at 642 are provided by the orchestrator 606 to the large language model 610 at 646, where a response is received at 648. A number of elements used in the prompt can be limited to avoid token limits in a prompt or to help ensure that embeddings used by the large language model capture sufficient information. That is, typically, the more elements that are included in a prompt, the less information is stored about them in an embedding. So, for example, a top one hundred elements can be included in the prompt.

An example request 1110 to the large language model 610 is shown in FIG. 11. The example request 1110 includes the user prompt and the identified elements (fields). The request 1110 instructs the large language model 610 to select fields relevant to the user prompt, and return the index of the selected fields, in a specified JSON format. FIG. 11 also shows an example response 1130 received from the large language model 610 after processing the request 1110. The indexes provided in the example response 1130 can be correlated to the sorted element list to identify the elements selected as relevant by the large language model 610. This approach helps reduce hallucinations by ensuring that only existing field names are selected based on their indexes, rather than relying on potentially incorrect field names generated by the large language model 610.

The elements identified in the response 648 can include elements from different data objects—the starting view and at least a portion of its associated views. A next part of the operations 600 involves determining association paths between related views. With reference to FIG. 6B, the orchestrator 606 submits a request 656 to the knowledge graph 608 to obtain parts of all possible association paths for each element selected by the large language model 610 that serves as a foreign key. A response 658 provides the requested association path parts.

FIG. 12 illustrates an example SPARQL query 1200 that can be provided to be processed by the knowledge graph 608. In this case, rather than providing the foreign key elements themselves, the view associated with a foreign key element is provided as a target of the starting view. A query is defined, and executed, to identify association paths between those two views, where typically the association paths use the foreign key elements identified by the large language model 610.

Figure 13:
FIG. 13 provides an example response to the SPARQL query of FIG. 12.

FIG. 13 provides an example response 1300. Lines 1310 provide the format for the response data, where the name of a source view and the name of the relevant element of the source view used in the association are provided, followed by the name of the target view and the name of the relevant element of the target view used in the association.

Returning to FIG. 6B, at 664, the orchestrator 606 constructs all possible full association paths from the association path parts (a path between two particular views in an overall association path) received at 658. For example, the information about the views and elements used in their associations can be used to create a graph data structure. Techniques such as depth first or breadth first traversal algorithms can be used to construct full association paths.

The orchestrator 606 sends a request 668 to the vector store 612 to generate similarity scores between the user prompt and each of the full associated paths determined at 664. A response 670 provides the similarity scores for each path. FIG. 14 provides an example request 1410, showing the user prompt 1412 and the association paths 1414. An example response 1450 lists each association path and its respective similarity score.

In a similar manner as operation 642, the list of association paths in the response 670 is sorted by similarity score, such as in descending order. The sorted list of association paths can then be provided to the large language model 610 in a request 676. As before, the list can include an index value for each path, to assist in distinguishing any full association paths that may have identical similarity scores. The large language model 610 then determines which association paths are most relevant to the user request, and identifies the most relevant paths, such as by index value, in a response 678. Using indexes for selection helps avoid working directly on the output of the large language model 610, thereby reducing potential errors and ensuring more reliable results.

FIG. 15 provides an example request 1510 to the large language model, as well as an example response 1550. The request 1510 includes instructions 1514 for the large language model 610, including content of the user prompt, and instructions 1516 that specify a particular output format. Allowing the large language model 610 to select the "best" association path based on the user prompt can provide more accurate results than simply selecting the association path with the highest similarity score to the user prompt. For example, there may be association paths that differ only in an element used in an association between two views. Submitting the list to the large language model 610 can help ensure that the correct linking element is selected, such as in the situation where a customer can be a billed to party, a sold to party, a shipped to party, or a payer.

In some cases, a process of identifying association paths for elements in response to a user prompt, and their associated views, can produce identical association paths. These redundant paths are not needed to generate the new view, and so deduplication can be performed at 684. At 686, appropriate commands, such as a SQL statement, can be created that, when executed, cause the requested object to be instantiated or at least included in a schema. At 688, the command is executed, and control can pass back to the user 604, such as by displaying an indication of whether the operations 600 completed successfully, and optionally displaying a representation or indication of the new view in a user interface. FIG. 16 provides an example SQL statement 1610 for generating a new view based on the views and association paths identified using the operations 600 as part of a definition 1600 of the new object. Other information can be filled in for the definition 1600 automatically, such as using a template for a particular view type.

While a variety of techniques can be used to generate commands to implement a view, in one scenario, a combination of parser-based and template-based approaches are used, which operate using the identified relationships between views. Initially, a parser can be used to process the identified views and their corresponding association paths. The parser is configured to traverse the association paths, understand the logical relationships between the views, and then extract the relevant metadata from each view, such as view names, attribute mappings, and join conditions. During this traversal, the parser builds an internal representation of the query structure, mapping out the required joins, filters, and projections based on the identified association paths. This internal representation can be structured as an abstract syntax tree or similar data structure.

After the parsing phase, the template-based approach can be used. A predefined SQL template can be designed to accommodate various types of queries, such as select queries, join queries, or aggregate queries. The internal representation of the query structure, generated by the parser, is mapped onto this SQL template. The template contains placeholders for various components of the SQL statement, such as the SELECT clause, FROM clause, JOIN conditions, and WHERE filters. As processing continues, these placeholders are replaced with the actual view names, attribute names, and conditions extracted from the internal representation. For example, in the case of a join operation, the template would specify the format of the JOIN clause, and the corresponding view names and join conditions are injected into this part of the template by substituting the relevant placeholders with the actual values.

Dynamic aspects of the SQL generation process can be handled by the template-based approach, such as determining whether to use an inner join, left join, or right join based on the type of associations identified between the views. The template can adapt to these dynamic decisions by including conditional logic within the placeholders, where the type of join is determined based on the association path characteristics, including whether the association is mandatory or optional. Similarly, the WHERE clause can be populated with filter conditions derived from the association paths, particularly when certain views or entities impose constraints that need to be carried through the SQL query. In certain implementations, this entire process can be optimized by applying rules for query optimization, such as reducing unnecessary joins or simplifying filter conditions where applicable.

Example 6—Example Operations to Determine Starting Data Object

The operations 600 of FIGS. 6A and 6B assume the availability of an identified starting data object, a starting view. In some cases, the operations 600 can be carried out without such an identification. For example, views relevant to a user prompt can be identified in a knowledge graph, and relevant elements selected and processed as described. However, the number of views and elements may be much larger compared with looking at views related to a specified starting view. Thus, the operations 600 can involve looking at a greater number of elements, generating and evaluating more similarity scores, having longer prompts to a large language model (which can reduce result accuracy), and identifying and evaluating a greater number of association paths. Thus, while a fixed starting data object is not required in some cases, a substantial increase in computer resources may be needed to carry out the operations 600.

In some scenarios, a fixed starting view can be provided along with a user prompt. The fixed starting view can be configured for a particular application or particular application functionality. In other cases, a user can select a starting view from information regarding at least some available views. However, as noted, at least certain users may not have access to view information or the technical abilities to access or use the information. Accordingly, the present disclosure provides a technique for identifying a starting view based on a user prompt, as explained with respect to the operations 1700 of FIG. 17.

Figure 17:
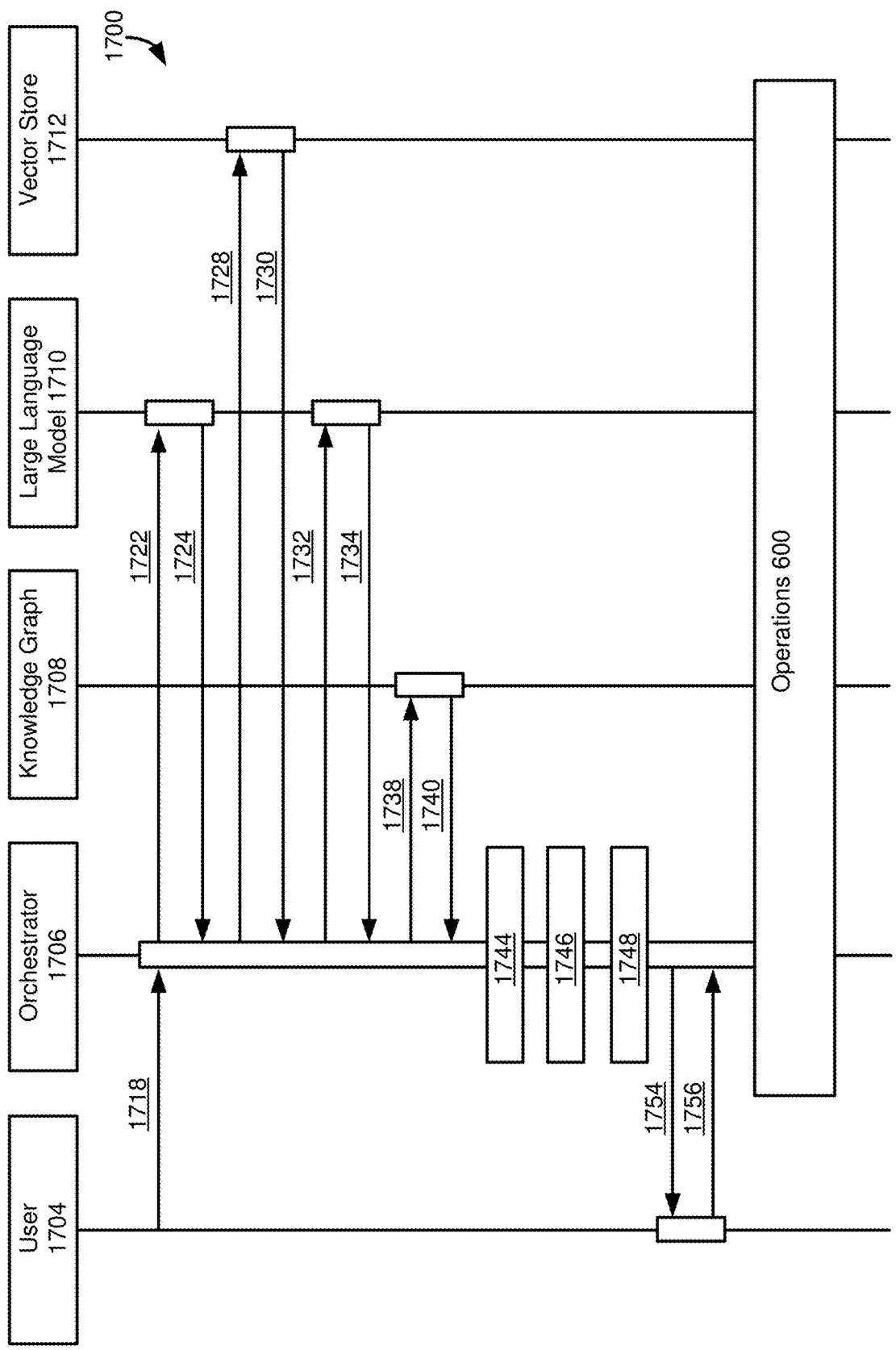
FIG. 17 provides a timing diagram of operations with various components of the computing environment of FIG. 1 in identifying a starting data object for use in the process of FIGS. 6A and 6B.

FIG. 17 provides a timing diagram of the operations 1700, as performed by a user 1704, an orchestrator 1706, a knowledge graph 1708, a large language model 1710, and a vector store 1712, where those components can correspond to the similarly titled and numbered components 604, 606, 608, 610, 612 of FIG. 6.

The user 1704 submits a prompt 1718 to the orchestrator 1706, which generates a prompt to be provided in a request 1722 to the large language model 1710 to identify keywords in the user prompt, which are provided in a response 1724. The operations can be performed in a similar manner as described for 626 and 628 of FIG. 16A. FIG. 18 provides an example request 1810 and an example response 1820.

The orchestrator 1706 then submits the keywords to the vector store 1712 in a request 1728. The request 1728 is to identify elements of a schema that are similar to the embeddings of the keywords identified in the user prompt, where the vector store 1712 stores embeddings of information included in the knowledge graph 1708. A response 1730 to the request contains a list of elements and their similarity scores. The operations involving the request 1728 and the response 1730 can be performed in a similar manner as described with respect to the request and response 632, 634, but where the search is not limited to a specified starting view. FIG. 19 provides an example request 1910, and an example response 1920.

The orchestrator 1706 can then submit at least a portion of the identified elements, optionally ordered by similarity score, to the large language model 1710 in a request 1732, where a response 1734 provides the elements selected by the large language model, such as their index. The request 1732 and response 1734 can be carried out in a similar manner as described for the request 646 and the response 648. FIG. 20 provides an example request 2010 and an example response 2020.

For the selected elements, the orchestrator 1706 sends a request 1738 to the knowledge graph to identify views of a set of available views to see if a given element is an element of the view or is reachable to the view via associations to other views. A response 1740 provides the identified views. These views can serve as candidates for a starting view, where further processing is performed to select a particular starting view from the available candidates. FIG. 21 provides an example request 2110 and an example response 2120.

The further processing can be performed by the orchestrator 1706. At 1744, the orchestrator 1706 can sort the identified views by the number of elements contained in the view or reachable from the view. Depending on the implementation, the directly reachable and indirectly reachable elements are added together and then the views are sorted. In other scenarios, directly reachable elements can be weighted more heavily for sorting, or indirectly reachable elements can be used to sort between views that have the same number of directly reachable elements.

At 1746, the sorted list from 1744 is filtered to only those views with the highest number of reachable elements, or otherwise having the same highest value in the sorted list. If only a single view has the highest number of elements, it is selected as the starting view, otherwise additional operations 1748 can be performed. For example, the views in the filtered list from 1746 can be provided to the user 1704 at 1754, and a user selection of the starting view can be received at 1756. In other implementations, the request and response 1754, 1756 can be to and from the large language model 1710, asking the large language model to select a starting view based on the user prompt.

FIG. 22 illustrates a situation where the operations 1744, 1746 result in a single identified starting view candidate, which is selected as the starting view. A sorted list 2210 of views is provided, as well as a list 2220 filtered to only the highest scoring candidates, which in this case is a single view. The selected starting view is provided as an output 2230.

After determining the starting view, the operations 1700 can proceed to the operations 600 of FIGS. 6A and 6B.

Some of the operations 1700 duplicate operations in the operations 600. When implementing both processes, duplicative operations can be omitted, and results from a single query or prompt, for example, can be used in both selecting a starting data object and in generating a new data object using that starting data object.

Example 7—Example Operations

Figure 23:
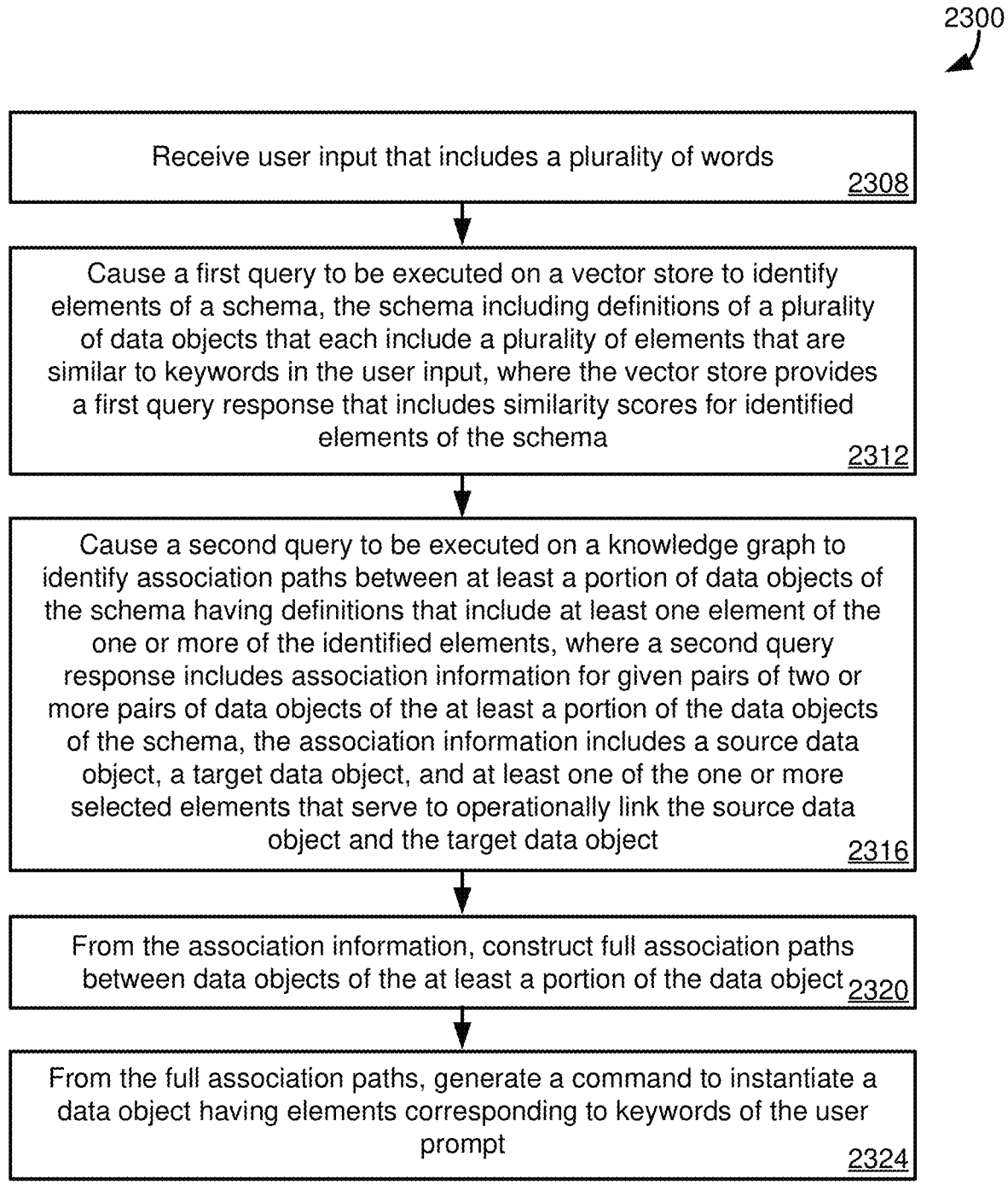
FIG. 23 is a flowchart of operations in a process for generating a command to create a data object based on user input.

FIG. 23 illustrates a flowchart of a process 2300 for generating a command to create a data object based on user input.

At 2308, user input is received that includes a plurality of words. A first query is caused to be executed on a vector store to identify elements of a schema at 2312. The schema includes definitions of a plurality of data objects that each include a plurality of elements that are similar to keywords in the user input. The vector store provides a first query response that includes similarity scores for identified elements of the schema.

At 2316, a second query is caused to be executed on a knowledge graph to identify association paths between at least a portion of data objects of the schema having definitions that include at least one element of the one or more of the identified elements. The second query response includes association information for given pairs of two or more pairs of data objects of the at least a portion of the data objects of the schema. This association information includes a source data object, a target data object, and at least one of the one or more selected elements that serve to operationally link the source data object and the target data object.

From the association information, at 2320, full association paths between data objects of the at least a portion of the data objects are constructed. At 2324, from the full association paths, a command is generated to instantiate a data object having elements corresponding to keywords of the user prompt.

Example 8—Additional Examples

Example 1 provides a computing system that includes at least one hardware processor, at least one memory coupled to the hardware processor, and one or more computer-readable storage media. The operations include receiving user input comprising a plurality of words, causing a first query to be executed on a vector store to identify elements of a schema, causing a second query to be executed on a knowledge graph to identify association paths, constructing full association paths from the association information, and generating a command to instantiate a data object.

Example 2 is the computing system of Example 1, where the operations further include submitting a first prompt to a large language model, the first prompt including at least a portion of the identified elements with an instruction to select identified elements that are relevant to the user input. The first prompt response from the large language model includes one or more selected elements, and the second query is generated using the selected elements.

Example 3 is the computing system of Example 2, where the operations further include sorting execution results of the first query by similarity score to provide sorted elements, and the first prompt comprises the at least a portion of the identified elements as sorted elements.

Example 4 is the computing system of any of Examples 1-3, where the operations further include processing the knowledge graph to provide extracted information regarding data objects and data object elements, generating semantic embeddings for the extracted information, and storing the semantic embeddings in the vector store.

Example 5 is the computing system of any of Examples 1-4, where the operations further include receiving an identifier for a starting data object of the schema, and causing a third query to be executed on the knowledge graph to identify data objects being directly or indirectly related to the starting data object.

Example 6 is the computing system of Example 5, where the identifier is provided with the user input.

Example 7 is the computing system of Example 5, where the operations further include causing a third query to be executed on the vector store to identify elements of the schema that are similar to keywords of the user prompt, causing a fourth query to be executed on the knowledge graph to identify data objects of the schema, determining a number of elements reachable through a given data object, and selecting as the starting data object a data object having a highest number of elements.

Example 8 is the computing system of Examples 5-7, wherein the first query is constrained to a starting data object and data objects that are directly or indirectly related to the starting data object.

Example 9 is the computing system of any of Examples 5-8, wherein first queries are performed for the starting data object and each data object that is directly or indirectly related to the starting data object.

Example 10 is the computing system of any of Examples 5-9, where the operations further include causing a query to be executed on the vector store to identify elements of the schema that are similar to keywords of the user prompt, causing a query to be executed on the knowledge graph to identify data objects of the schema, determining a number of elements reachable through a given data object, determining that multiple data objects have a highest number of reachable elements, displaying to a user identifiers for data objects of the multiple data objects, and receiving user input selecting a data object as the starting data object.

Example 11 is the computing system of any of Examples 1-10, where the operations further include submitting a first prompt to a large language model, the first prompt including the user input and an instruction to identify the keywords in the user input.

Example 12 is the computing system of any of Examples 1-11, where the operations further include submitting a prompt to a large language model, the prompt including the full association paths and an instruction to select a full association path that best matches the user input.

Example 13 is the computing system of any of Examples 1-12, where the operations further include causing a query to be executed on the vector store to evaluate similarity of the full association paths to the user input.

Example 14 is the computing system of Example 13, where the operations further include sorting execution results of the third query by similarity score to provide sorted full association paths, and submitting a first prompt to a large language model, the first prompt comprising the sorted full association paths and an instruction to select a full association path that best matches the user input.

Example 15 is the computing system of Example 1, where the operations further include processing the knowledge graph to provide extracted information regarding data objects and data object elements in the knowledge graph, generating semantic embeddings for the extracted information, and storing the semantic embeddings in the vector store. The operations also include submitting a first prompt to a large language model, the first prompt comprising at least a portion of the identified elements with an instruction to select identified elements that are relevant to the user input. The first prompt response from the large language model comprises one or more selected elements, and the second query is generated using the selected elements. Additionally, the operations include sorting execution results of the first query by similarity score to provide sorted elements, constructing full association paths between data objects of the schema from the association information, causing a third query to be executed on the vector store to evaluate similarity of the full association paths to the user input, sorting execution results of the third query by similarity score to provide sorted full association paths, submitting a second prompt to a large language model, the second prompt comprising the full association paths and an instruction to select a full association path that best matches the user input, and generating a command to instantiate a data object having elements corresponding to keywords of the user prompt.

Example 16 is the computing system of any of Examples 1-14, where the operations further include causing the command to be executed, thus generating the data object in the schema.

Example 17 provides a method implemented in a computing environment comprising at least one hardware processor and at least one memory coupled to the hardware processor. The method includes receiving user input comprising a plurality of words, causing a first query to be executed on a vector store to identify elements of a schema, causing a second query to be executed on a knowledge graph to identify association paths, constructing full association paths from the association information, and generating a command to instantiate a data object having elements corresponding to keywords of the user prompt.

Example 18 is the method of Example 17, where the operations further include submitting a first prompt to a large language model, the first prompt comprising at least a portion of the identified elements with an instruction to select identified elements that are relevant to the user input. The first prompt response from the large language model comprises one or more selected elements, and the second query is generated using the selected elements. Additionally, the operations include sorting execution results of the first query by similarity score to provide sorted elements, receiving an identifier for a starting data object of the schema, and causing a third query to be executed on the knowledge graph to identify data objects being directly or indirectly related to the starting data object.

Example 19 provides one or more non-transitory computer-readable media comprising computer-executable instructions that, when executed by a computing system comprising at least one hardware processor and at least one memory, cause the computing system to receive user input comprising a plurality of words, cause a first query to be executed on a vector store to identify elements of a schema, cause a second query to be executed on a knowledge graph to identify association paths, construct full association paths from the association information, and generate a command to instantiate a data object having elements corresponding to keywords of the user prompt.

Example 20 is the one or more non-transitory computer-readable storage media of Example 19, where the operations further include submitting a first prompt to a large language model, the first prompt comprising at least a portion of the identified elements with an instruction to select identified elements that are relevant to the user input. The first prompt response from the large language model comprises one or more selected elements, and the second query is generated using the selected elements. Additionally, the operations include storing execution results of the first query by similarity score to provide sorted elements, receiving an identifier for a starting data object of the schema, and causing a third query to be executed on the knowledge graph to identify data objects being directly or indirectly related to the starting data object, where data objects used in the second query are data objects identified by the third query.

Example 9—Computing Systems

Figure 24:
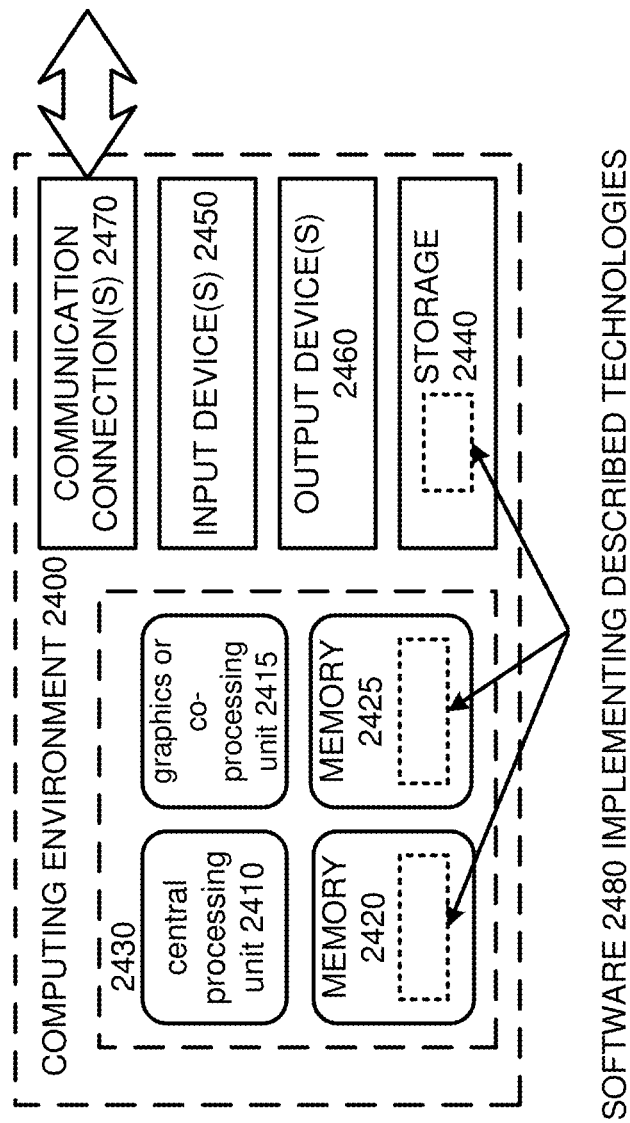
FIG. 24 is a diagram of an example computing system in which some described embodiments can be implemented.

FIG. 24 depicts a generalized example of a suitable computing system 2400 in which the described innovations may be implemented. The computing system 2400 is not intended to suggest any limitation as to scope of use or functionality of the present disclosure, as the innovations may be implemented in diverse general-purpose or special-purpose computing systems.

With reference to FIG. 24, the computing system 2400 includes one or more processing units 2410, 2415 and memory 2420, 2425. In FIG. 24, this basic configuration 2430 is included within a dashed line. The processing units 2410, 2415 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 24 shows a central processing unit 2410 as well as a graphics processing unit or co-processing unit 2415. The tangible memory 2420, 2425 may be volatile memory (e.g., registers, cache, RAM), non-volatile memory (e.g., ROM, EEPROM, flash memory, etc.), or some combination of the two, accessible by the processing unit(s) 2410, 2415. The memory 2420, 2425 stores software 2480 implementing one or more innovations described herein, in the form of computer-executable instructions suitable for execution by the processing unit(s) 2410, 2415. The memory 2420, 2425, may also store database data or buffer data.

A computing system 2400 may have additional features. For example, the computing system 2400 includes storage 2440, one or more input devices 2450, one or more output devices 2460, and one or more communication connections 2470. An interconnection mechanism (not shown) such as a bus, controller, or network interconnects the components of the computing system 2400. Typically, operating system software (not shown) provides an operating environment for other software executing in the computing system 2400, and coordinates activities of the components of the computing system 2400. In some cases, the operating system can manage, or assist in managing, query language execution threads or job execution threads.

The tangible storage 2440 may be removable or non-removable, and includes magnetic disks, magnetic tapes or cassettes, CD-ROMs, DVDs, or any other medium which can be used to store information in a non-transitory way and which can be accessed within the computing system 2400. The storage 2440 stores instructions for the software 2420 implementing one or more innovations described herein.

The input device(s) 2450 may be a touch input device such as a keyboard, mouse, pen, or trackball, a voice input device, a scanning device, or another device that provides input to the computing system 2400. The output device(s) 2460 may be a display, printer, speaker, CD-writer, or another device that provides output from the computing system 2400.

The communication connection(s) 2470 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 25:
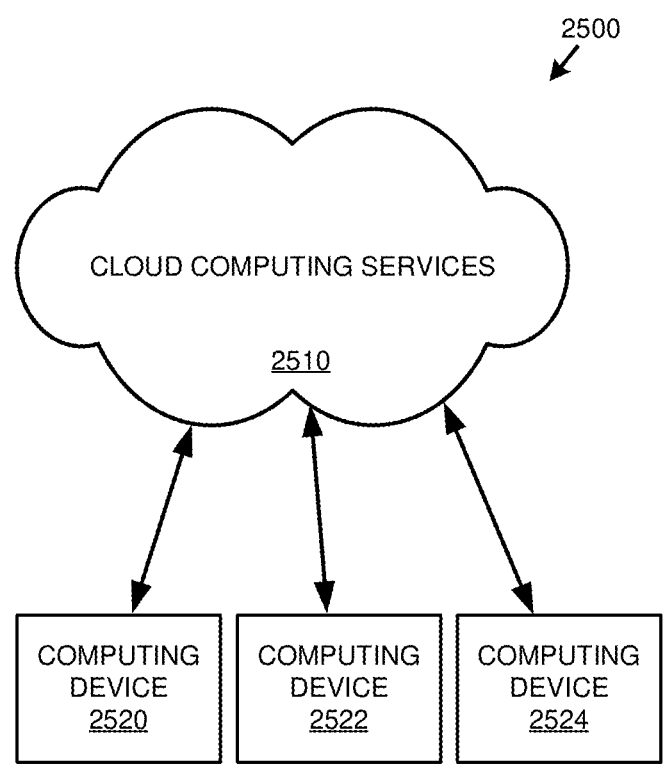
FIG. 25 is an example cloud computing environment that can be used in conjunction with the technologies described herein.

FIG. 25 depicts an example cloud computing environment 2500 in which the described technologies can be implemented. The cloud computing environment 2500 comprises cloud computing services 2510. The cloud computing services 2510 can comprise various types of cloud computing resources, such as computer servers, data storage repositories, networking resources, etc. The cloud computing services 2510 can be centrally located (e.g., provided by a data center of a business or organization) or distributed (e.g., provided by various computing resources located at different locations, such as different data centers and/or located in different cities or countries).

The cloud computing services 2510 are utilized by various types of computing devices (e.g., client computing devices), such as computing devices 2520, 2522, and 2524. For example, the computing devices (e.g., 2520, 2522, and 2524) can be computers (e.g., desktop or laptop computers), mobile devices (e.g., tablet computers or smart phones), or other types of computing devices. For example, the computing devices (e.g., 2520, 2522, and 2524) can utilize the cloud computing services 2510 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 24, computer-readable storage media include memory 2420 and 2425, and storage 2440. The term computer-readable storage media does not include signals and carrier waves. In addition, the term computer-readable storage media does not include communication connections (e.g., 2470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media comprising computer-executable instructions that, when executed, cause the computing system to perform operations comprising:
receiving user input comprising a plurality of words;
causing a first query to be executed on a vector store to identify elements of a schema, the schema comprising definitions of a plurality of data objects that each include a plurality of elements that are similar to keywords in the user input, where the vector store provides a first query response that comprises similarity scores for identified elements of the schema;

causing a second query to be executed on a knowledge graph to identify association paths between at least a portion of data objects of the schema having definitions that comprise at least one element of the one or more of the identified elements, where a second query response comprises association information for given pairs of two or more pairs of data objects of the at least a portion of the data objects of the schema, the association information comprising a source data object, a target data object, and at least one of the one or more selected elements that serve to operationally link the source data object and the target data object;

from the association information, constructing full association paths between data objects of the at least a portion of the data object; and from the full association paths, generating a command to instantiate a data object having elements corresponding to keywords of the user prompt.

2. The computing system of claim 1, the operations further comprising:

submitting a first prompt to a large language model, the first prompt comprising at least a portion of the identified elements with an instruction to select identified elements that are relevant to the user input, wherein a first prompt response from the large language model comprises one or more selected elements selected from the at least a portion of the identified elements, where the second query is generated using the selected elements.

3. The computing system of claim 2, the operations further comprising:

sorting execution results of the first query by similarity score to provide sorted elements, wherein the first prompt comprises the at least a portion of the identified elements as sorted elements.

4. The computing system of claim 1, the operations further comprising:

processing the knowledge graph to provide extracted information regarding data objects and data object elements in the knowledge graph; and generating semantic embeddings for the extracted information; and storing the semantic embeddings in the vector store.

5. The computing system of claim 1, the operations further comprising:

receiving an identifier for a starting data object of the schema; and causing a third query to be executed on the knowledge graph to identify data objects being directly or indirectly related to the starting data object, where data objects used in the second query are data objects identified by the third query.

6. The computing system of claim 5, wherein the identifier is provided with the user input.

7. The computing system of claim 5, the operations further comprising:

causing a third query to be executed on the vector store to identify elements of the schema that are similar to keywords of the user prompt, where the vector store provides a third query response that comprises similarity scores for identified elements of the schema, where the third query is the first query or is a different query;

causing a fourth query to be executed on the knowledge graph to identify data objects of the schema to determine if an element of the identified elements of the schema of the third query response is included in a given data object of the schema or can be retrieved via associations of the given data object with other data objects of the schema, the fourth query providing a fourth query response comprising data objects identified by the fourth query;

for data objects identified in the fourth query response, determining a number of elements reachable through a given data object of the data objects identified in the fourth query response; and selecting as the starting data object a data object having a highest number of elements.

8. The computing system of claim 5, wherein the first query is constrained to a starting data object and data objects that are directly or indirectly related to the starting data object.

9. The computing system of claim 5, wherein first queries are performed for the starting data object and each data object that is directly or indirectly related to the starting data object.

10. The computing system of claim 5, the operations further comprising:

causing a third query to be executed on the vector store to identify elements of the schema that are similar to keywords of the user prompt, where the vector store provides a third query response that comprises similarity score for identified elements of the schema, where the third query is the first query or is different than the first query;

causing a fourth query to be executed on the knowledge graph to identify data objects of the schema to determine if an element of the identified elements of the schema of the third query response is included in a given data object of the schema or can be retrieved via associations of the given data object with other data objects of the schema, the fourth query providing a fourth query response comprising data objects identified by the fourth query;

for data objects identified in the fourth query response, determining a number of elements reachable through a given data object of the data objects identified in the fourth query response;

determining that multiple data objects identified in the fourth query response have a highest number of reachable elements;

displaying to a user identifiers for data objects of the multiple data objects; and receiving user input selecting a data object of the multiple data objects as the starting data object.

11. The computing system of claim 1, the operations further comprising:

submitting a first prompt to a large language model, the first prompt comprising the user input and an instruction to identify the keywords in the user input.

12. The computing system of claim 1, the operations further comprising:

submitting a first prompt to a large language model, the first prompt comprising the full association paths and an instruction to select a full association path the best matches the user input.

13. The computing system of claim 1, the operations further comprising:

causing a third query to be executed on the vector store to evaluate similarity of the full association paths to the user input.

14. The computing system of claim 13, the operations further comprising:
sorting execution results of the third query by similarity score to provide sorted full association paths; and
submitting a first prompt to a large language model, the first prompt comprising the sorted full association paths and an instruction to select a full association path that best matches the user input.

15. The computing system of claim 1, the operations further comprising:
processing the knowledge graph to provide extracted information regarding data objects and data object elements in the knowledge graph;
generating semantic embeddings for the extracted information;
storing the semantic embeddings in the vector store;
submitting a first prompt to a large language model, the first prompt comprising at least a portion of the identified elements with an instruction to select identified elements that are relevant to the user input, wherein a first prompt response from the large language model comprises one or more selected elements selected from the at least a portion of the identified elements, where the second query is generated using the selected elements;
sorting execution results of the first query by similarity score to provide sorted elements, wherein the first prompt comprises the at least a portion of the identified elements as sorted elements;
constructing full association paths between data objects of the at least a portion of the data objects of the schema from the association information;
causing a third query to be executed on the vector store to evaluate similarity of the full association paths to the user input;
sorting execution results of the third query by similarity score to provide sorted full association paths;
submitting a second prompt to a large language model, the second prompt comprising the full association paths and an instruction to select a full association path that best matches the user input; and
generating a command to instantiate a data object having elements corresponding to keywords of the user prompt.

16. The computing system of claim 1, the operations further comprising:
causing the command to be executed, thus generating the data object in the schema.

17. A method, implemented in a computing environment comprising at least one hardware processor and at least one memory coupled to the at least one hardware processor, the method comprising:
receiving user input comprising a plurality of words;
causing a first query to be executed on a vector store to identify elements of a schema, the schema comprising definitions of a plurality of data objects that each include a plurality of elements that are similar to keywords in the user input, where the vector store provides a first query response that comprises similarity scores for identified elements of the schema;
causing a second query to be executed on a knowledge graph to identify association paths between at least a portion of data objects of the schema having definitions that comprise at least one element of the one or more of the identified elements, where a second query response comprises association information for given pairs of two or more pairs of data objects of the at least a portion of the data objects of the schema, the association information comprising a source data object, a target data object, and at least one of the one or more selected elements that serve to operationally link the source data object and the target data object;
from the association information, constructing full association paths between data objects of the at least a portion of the data object; and
from the full association paths, generating a command to instantiate a data object having elements corresponding to keywords of the user prompt.

18. The method of claim 17, further comprising:
submitting a first prompt to a large language model, the first prompt comprising at least a portion of the identified elements with an instruction to select identified elements that are relevant to the user input, wherein a first prompt response from the large language model comprises one or more selected elements selected from the at least a portion of the identified elements, where the second query is generated using the selected elements;
sorting execution results of the first query by similarity score to provide sorted elements, wherein the first prompt comprises the at least a portion of the identified elements as sorted elements;
receiving an identifier for a starting data object of the schema; and
causing a third query to be executed on the knowledge graph to identify data objects being directly or indirectly related to the starting data object, where data objects used in the second query are data objects identified by the third query.

19. One or more non-transitory computer-readable media comprising:
computer-executable instruction that, when executed by a computing system comprising at least one hardware processor and at least one hardware processor, cause the computing system to receive user input comprising a plurality of words;
computer-executable instruction that, when executed by the computing system, cause the computing system to cause a first query to be executed on a vector store to identify elements of a schema, the schema comprising definitions of a plurality of data objects that each include a plurality of elements that are similar to keywords in the user input, where the vector store provides a first query response that comprises similarity scores for identified elements of the schema;
computer-executable instruction that, when executed by the computing system, cause the computing system to cause a second query to be executed on a knowledge graph to identify association paths between at least a portion of data objects of the schema having definitions that comprise at least one element of the one or more of the identified elements, where a second query response comprises association information for given pairs of two or more pairs of data objects of the at least a portion of the data objects of the schema, the association information comprising a source data object, a target data object, and at least one of the one or more selected elements that serve to operationally link the source data object and the target data object;
computer-executable instruction that, when executed by the computing system, cause the computing system to, from the association information, construct full association paths between data objects of the at least a portion of the data object; and computer-executable instruction that, when executed by the computing system, cause the computing system to, from the full association paths, generate a command to instantiate a data object having elements corresponding to keywords of the user prompt.

20. The one or more non-transitory computer-readable storage media of claim 19, further comprising:

computer-executable instruction that, when executed by the computing system, cause the computing system to submit a first prompt to a large language model, the first prompt comprising at least a portion of the identified elements with an instruction to select identified elements that are relevant to the user input, wherein a first prompt response from the large language model comprises one or more selected elements selected from the at least a portion of the identified elements, where the second query is generated using the selected elements;

computer-executable instruction that, when executed by the computing system, cause the computing system to store execution results of the first query by similarity score to provide sorted elements, wherein the first prompt comprises the at least a portion of the identified elements as sorted elements;

computer-executable instruction that, when executed by the computing system, cause the computing system to receive an identifier for a starting data object of the schema; and computer-executable instruction that, when executed by the computing system, cause the computing system to cause a third query to be executed on the knowledge graph to identify data objects being directly or indirectly related to the starting data object, where data objects used in the second query are data objects identified by the third query.

* * * * *